US010809679B2

(12) United States Patent
Kim

(10) Patent No.: US 10,809,679 B2
(45) Date of Patent: Oct. 20, 2020

(54) SERVER AND METHOD OF CONTROLLING USER ENVIRONMENT BY SERVER

(71) Applicant: Samsung Electronics Co., Ltd, Gyeonggi-do (KR)

(72) Inventor: Ji-Eun Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 51 days.

(21) Appl. No.: 15/418,601

(22) Filed: Jan. 27, 2017

(65) Prior Publication Data

US 2017/0242412 A1    Aug. 24, 2017

(30) Foreign Application Priority Data

Feb. 24, 2016   (KR) .................. 10-2016-0022147

(51) Int. Cl.
   *G05B 15/02*   (2006.01)
   *H04L 29/08*   (2006.01)
   (Continued)

(52) U.S. Cl.
   CPC ............. *G05B 15/02* (2013.01); *H04B 1/385* (2013.01); *H04L 12/2827* (2013.01);
   (Continued)

(58) Field of Classification Search
   CPC ... G05B 15/02; H04L 12/2803; H04L 67/125; H04L 67/22; H04M 1/0202; H04B 1/385; H04W 4/80; H04W 4/38
   (Continued)

(56) References Cited

U.S. PATENT DOCUMENTS

| 7,778,734 B2 | 8/2010 | Oswald et al. |
| 8,744,803 B2 | 6/2014 | Park et al. |

(Continued)

FOREIGN PATENT DOCUMENTS

| CN | 103283257 A | 9/2013 |
| CN | 103712313 A | 4/2014 |

(Continued)

OTHER PUBLICATIONS

International Search Report dated May 15, 2017 in connection with International Patent Application No. PCT/KR2017/001417.

(Continued)

*Primary Examiner* — Ziaul Karim

(57) ABSTRACT

Disclosed is a server including a communication module and a control module. The communication module is configured to acquire first activity information of at least one user activity from an electronic device or a smart device outside the server. The communication module may then acquire device information corresponding to the at least one user activity based on the acquired first activity information. The control module is configured to generate environment control information corresponding to the at least one user activity and to acquire second activity information of a new user activity after the at least one user activity is acquired. The control module further configured to detect environment control information corresponding to the user activity in the generated environment control information, and to control the smart device based on device information corresponding to the detected environment control information among the acquired device information through the communication module.

16 Claims, 29 Drawing Sheets

(51) Int. Cl.
*H04L 12/28* (2006.01)
*H04B 1/3827* (2015.01)
*H04M 1/02* (2006.01)
*H04W 4/38* (2018.01)
*H04W 4/80* (2018.01)

(52) U.S. Cl.
CPC ............ *H04L 67/125* (2013.01); *H04L 67/22* (2013.01); *H04M 1/0202* (2013.01); *G05B 2219/2642* (2013.01); *H04W 4/38* (2018.02); *H04W 4/80* (2018.02)

(58) Field of Classification Search
USPC .................................................. 700/276–296
See application file for complete search history.

(56) References Cited

U.S. PATENT DOCUMENTS

| | | | |
|---|---|---|---|
| 8,810,430 | B2 | 8/2014 | Proud |
| 2011/0046805 | A1 | 2/2011 | Bedros et al. |
| 2012/0031984 | A1* | 2/2012 | Feldmeier ............... F24F 11/30 236/49.3 |
| 2012/0083705 | A1* | 4/2012 | Yuen .................... A61B 5/0002 600/508 |
| 2012/0083716 | A1* | 4/2012 | Yuen .................... A61B 5/7455 600/595 |
| 2012/0173767 | A1 | 7/2012 | Kim et al. |
| 2013/0095459 | A1* | 4/2013 | Tran .................... A61B 5/6816 434/247 |
| 2013/0285836 | A1* | 10/2013 | Proud ..................... H01F 38/14 340/870.02 |
| 2013/0325190 | A1* | 12/2013 | Imes .................... G06F 3/0481 700/276 |
| 2014/0100700 | A1 | 4/2014 | Matsumoto et al. |
| 2014/0143064 | A1* | 5/2014 | Tran .................... A61B 5/0022 705/14.66 |
| 2014/0371925 | A1 | 12/2014 | Butler |
| 2015/0100167 | A1* | 4/2015 | Sloo ....................... F24F 11/30 700/278 |
| 2015/0120015 | A1* | 4/2015 | Fadell ................. G08B 19/005 700/90 |
| 2015/0156030 | A1* | 6/2015 | Fadell ................. H04L 12/2816 700/90 |
| 2015/0156031 | A1* | 6/2015 | Fadell ................. H04L 12/2816 700/276 |
| 2015/0195100 | A1 | 7/2015 | Imes et al. |
| 2015/0276239 | A1* | 10/2015 | Fadell ................ G05D 23/1905 237/2 A |
| 2016/0008632 | A1* | 1/2016 | Wetmore ................. A61N 7/00 601/2 |

FOREIGN PATENT DOCUMENTS

| | | |
|---|---|---|
| CN | 104110786 A | 10/2014 |
| CN | 104676843 A | 6/2015 |
| CN | 104748303 A | 7/2015 |
| CN | 104848473 A | 8/2015 |
| CN | 104949263 A | 9/2015 |
| CN | 105202691 A | 12/2015 |
| JP | 2009056075 | 3/2009 |
| JP | 2015152177 | 8/2015 |
| KR | 202009009100 | 9/2009 |
| KR | 101074300 B1 | 10/2011 |
| WO | 00/39964 A1 | 7/2000 |

OTHER PUBLICATIONS

Written Opinion of the International Searching Authority dated May 15, 2017 in connection with International Patent Application No. PCT/KR2017/001417.
Supplementary European Search Report dated Mar. 18, 2019 in connection with European Patent Application No. 1775 6740, 9 pages.
Notification of the First Office Action in connection with Chinese Application No. 201780012851.X dated Jul. 22, 2020, 23 pages.

* cited by examiner

SERVER AND METHOD OF CONTROLLING USER ENVIRONMENT BY SERVER

CROSS-REFERENCE TO RELATED APPLICATION(S) AND CLAIM OF PRIORITY

The present application is related to and claims priority under 35 U.S.C. § 119(a) to Korean Application Serial No. 10-2016-0022147, which was filed in the Korean Intellectual Property Office on Feb. 24, 2016, the entire content of which is hereby incorporated by reference.

TECHNICAL FIELD

The present disclosure relates to an electronic device and a technology for controlling a user environment by a server using at least one smart device.

BACKGROUND

Recently, technologies for controlling home appliances which cool and heat a home and air-conditioning devices that create a user environment (for example, indoor temperature) within home of a user have been disclosed.

The user may input a specific command into the home appliance or the air-conditioning device within a home to create a user environment which the user desires through the home appliance or the air-conditioning device.

For example, when the user desires to set a target indoor temperature of an air conditioner at 25 degrees Celsius (C) (or 77° Fahrenheit (F)) while exercising, the user may input a specific command to the air conditioner (for example, input the number "25" to indicate 25° C., or "77" to indicate 77° F., by using a number keypad on a remote control for controlling the air conditioner) before starting to exercise and start exercising in a state where the target indoor temperature of the air conditioner is set at 25 degrees Celsius (or 77° F.).

SUMMARY

As described above, the user may directly control home appliances and air-conditioning devices by inputting a particular command before conducting a particular activity.

It is a primary object of the present disclosure to provide a server that may detect, in advance, a user activity and grasp operation states of home appliances or air-conditioning devices at the moment when the user activity is conducted. The server may further store the operation states as data, and, when the corresponding user activity is detected again, automatically control the home appliances and the air-conditioning devices based on the stored data.

In accordance with an embodiment of the present disclosure, a server may includes a communication module configured to acquire first activity information of at least one user activity from an electronic device or at least one smart device outside the server. The server may additionally acquire device information corresponding to the at least one user activity based on the acquired first activity information. A control module may be configured to generate environment control information corresponding to the at least one user activity based on the acquired first activity information and device information and to acquire second activity information of a new user activity after the at least one user activity is acquired. The control module further configured to detect environment control information corresponding to the user activity in the generated environment control information based on the acquired second activity information, and to control the at least one smart device in the acquired device information through the communication module based on device information corresponding to the detected environment control information.

In accordance with another embodiment of the present disclosure, a method of controlling a user environment by a server is provided. The method includes acquiring first activity information of at least one user activity, and acquiring device information corresponding to the at least one user activity based on the acquired first activity information. The method further including generating environment control information corresponding to the at least one user activity based on the acquired first activity information and device information, and then acquiring second activity information of a user activity. Finally, the method may include detecting environment control information corresponding to the user activity among the generated environment control information based on the acquired second activity information, and controlling at least one smart device based on device information corresponding to the detected environment control information among the acquired device information.

According to various embodiments of the present disclosure, when a user conducts a particular activity, a server may store surrounding environment information including information on an indoor temperature around the user at the moment when the user conducts the corresponding activity and music played by a reproduction device around the user. In an embodiment, when the same user activity is detected again, the server may set a target indoor temperature around the user as the indoor temperature around the user at the moment when the user engages in the previously conducted same activity based on the surrounding environment information stored in the server. The server may further play the music that was played by the reproduction device around the user at the moment when the user previously conducted the same activity.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the FIG. 1 is a block diagram illustrating a server, a smart device, an electronic device, and a network according to various embodiments of the present disclosure.

DETAILED DESCRIPTION

Figure 1:
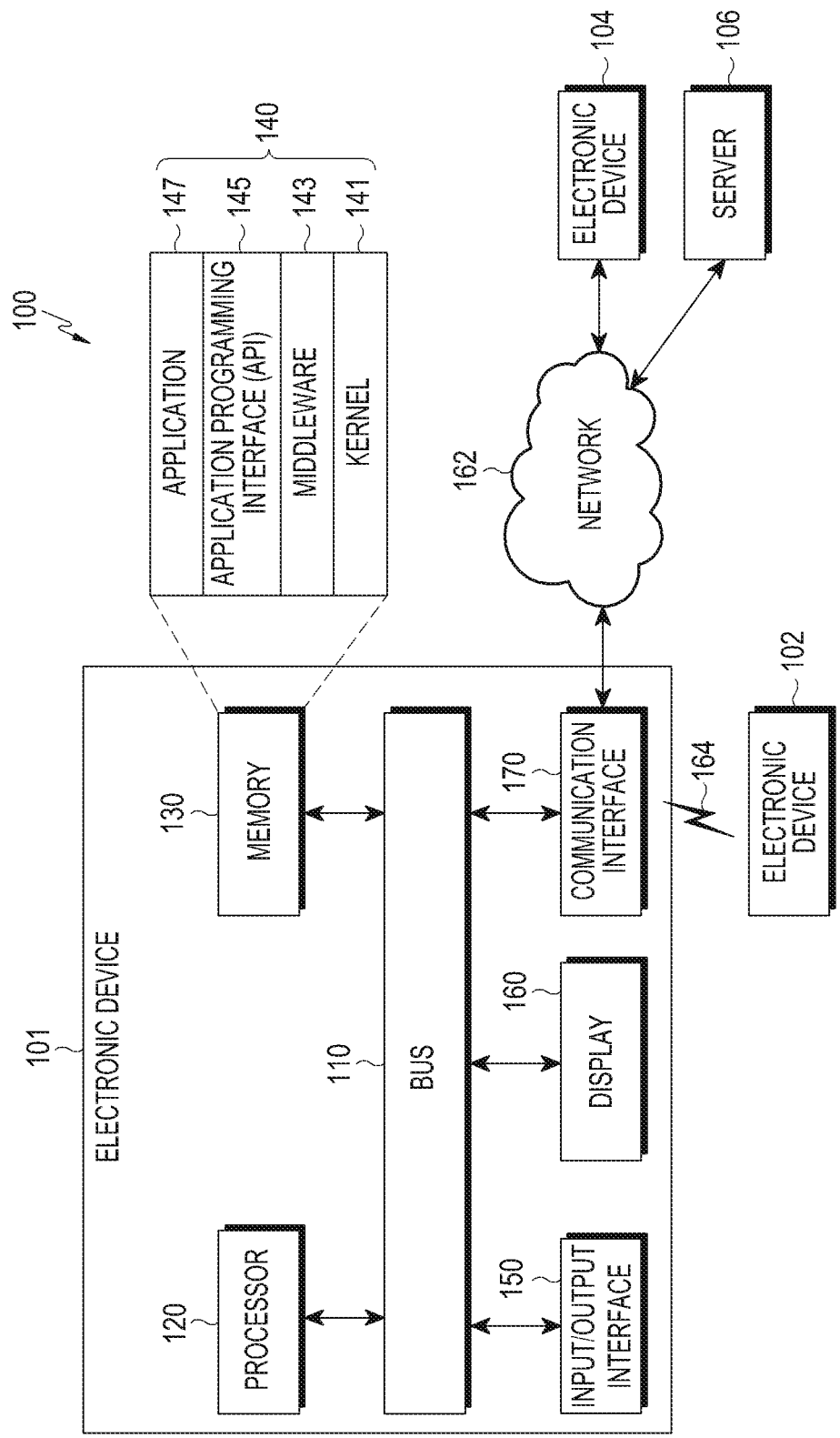

FIGS. 1 through 30, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, various embodiments of the present disclosure will be described with reference to the accompanying drawings. The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. As used herein, singular forms may include plural forms as well unless the context clearly indicates otherwise. As used herein, singular forms may include plural forms as well unless the context clearly indicates otherwise. The expression "a first", "a second", "the first", or "the second" may modify corresponding elements regardless of the order or importance, and is used only to distinguish one element from another element, but does not limit the corresponding elements. When an element (e.g., first element) is referred to as being "(functionally or communicatively) connected," or "directly coupled" to another element (second element), the element may be connected directly to the another element or connected to the another element through yet another element (e.g., third element).

The expression "configured to" as used in various embodiments of the present disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit). In some embodiments, the electronic device may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.). According to some embodiments, an electronic device may include at least one of a part of furniture or a building/structure, an electronic board, an electronic signature receiving device, a projector, and various types of measuring instruments (e.g., a water meter, an electric meter, a gas meter, a radio wave meter, and the like). In various embodiments, the electronic device may be flexible, or may be a combination of one or more of the aforementioned various devices. The electronic device according to one embodiment of the present disclosure is not limited to the above described devices. In the present disclosure, the term "user" may indicate a person using an electronic device or a device (e.g., an artificial intelligence electronic device) using an electronic device.

Referring to FIG. 1, an electronic device within a network environment 100 according to various embodiments will be described. The electronic device 101 may include a bus 110, a processor 120, a memory 130, an input/output interface 150, a display 160, and a communication interface 170. In some embodiments, the electronic device 101 may omit at least one of the elements, or may further include other elements. The bus 110 may include, for example, a circuit that interconnects the elements 110 to 170 and transfers communication (for example, control messages and/or data) between the elements. The processor 120 may include one or more of a central processing unit, an application processor, and a communication processor (CP). The processor 120, for example, may carry out operations or data processing relating to the control and/or communication of at least one other element of the electronic device 101.

The memory 130 may include a volatile and/or non-volatile memory. The memory 130 may store, for example, instructions or data relevant to at least one other element of the electronic device 101. According to an embodiment, the memory 130 may store software and/or a program 140. The program 140 may include, for example, a kernel 141, middleware 143, an application programming interface (API) 145, and/or application programs (or "applications") 147. At least a part of the kernel 141, the middleware 143, or the API 145 may be referred to as an Operating System (OS). The kernel 141 may control or manage system resources (for example, the bus 110, the processor 120, or the memory 130) used for executing an operation or function implemented by other programs (for example, the middleware 143, the API 145, or the application 147). Furthermore, the kernel 141 may provide an interface through which the middleware 143, the API 145, or the application programs 147 may access the individual elements of the electronic device 101 to control or manage the system resources.

The middleware 143 may function as, for example, an intermediary for allowing the API 145 or the application programs 147 to communicate with the kernel 141 to exchange data. Furthermore, the middleware 143 may process one or more task requests, which are received from the application programs 147, according to priorities thereof. For example, the middleware 143 may assign priorities for using the system resources (for example, the bus 110, the processor 120, the memory 130, and the like) of the electronic device 101 to one or more of the application programs 147, and may process the one or more task requests. The API 145 is an interface used by the applications 147 to control a function provided from the kernel 141 or the middleware 143, and may include, for example, at least one interface or function (for example, an instruction) for file control, window control, image processing, text control, and the like. For example, the input/output interface 150 may forward instructions or data, which is input from a user or an external device, to the other element(s) of the electronic device 101, or may output instructions or data, which is received from the other element(s) of the electronic device 101, to the user or the external device.

The display 160 may include, for example, a liquid crystal display (LCD), a light emitting diode (LED) display, an organic light emitting diode (OLED) display, a micro electro mechanical system (MEMS) display, or an electronic paper display. The display 160 may display, for example, various types of content (for example, text, images, videos, icons, and/or symbols) for a user. The display 160 may include a touch screen and may receive, for example, a touch, gesture, proximity, or hovering input using an electronic pen or the user's body part. The communication interface 170 may configure communication, for example, between the electronic device 101 and an external device (for example, a first external electronic device 102, a second external electronic device (for example, a smart device 104), or a server 106). For example, the communication interface 170 may be connected to the network 162 through wireless or wired communication to communicate with the external device (for example, the smart device 104 or the server 106).

The wireless communication may include, for example, a cellular communication that uses at least one of LTE, LTE-Advance (LTE-A), code division multiple access (CDMA), wideband CDMA (WCDMA), universal mobile telecommunications system (UMTS), wireless broadband (WiBro), global system for mobile communications (GSM), and the like. According to an embodiment, the wireless communication may include, for example, a near-distance communication 164. The near-distance communication 164 may include, for example, at least one of Wireless Fidelity (Wi-Fi), Bluetooth®, Bluetooth® low energy (BLE), Zigbee®, near field communication (NFC), magnetic secure transmission, radio frequency, and body area network (BAN). According to an embodiment, the wired communication may include GNSS. The GNSS may be, for example, a global positioning system (GPS), a global navigation satellite system (Glonass®), a Beidou® navigation satellite system (hereinafter, referred to as "Beidou"), or Galileo® (the European global satellite-based navigation system). Hereinafter, in this document, the "GPS" may be interchangeably used with the "GNSS". The wired communication may include, for example, at least one of a universal serial bus (USB), a high definition multimedia interface (HDMI), recommended standard 232 (RS-232), and a plain old telephone service (POTS). The network 162 may include a telecommunications network, for example, at least one of a computer network (for example, a LAN or a WAN), the Internet, and a telephone network.

Each of the first external electronic device 102 and the smart device 104 may be the same type as or different type from the electronic device 101. According to various embodiments, all or some of the operations performed by the electronic device 101 may be performed by another electronic device or a plurality of electronic devices (for example, the electronic device 102 or the smart device 104, or the server 106). According to an embodiment, when the electronic device 101 has to perform some functions or services automatically or in response to a request, the electronic device 101 may request another device (for example, the electronic device 102 or the smart device 104, or the server 106) to perform at least some functions relating thereto instead of, or in addition to, performing the functions or services by itself. Another electronic device (for example, the electronic device 102, the smart device 104, or the server 106) may execute the requested functions or the additional functions, and may deliver a result of the execution to the electronic device 101. The electronic device 101 may provide the received result as it is, or may additionally process the received result to provide the requested functions or services. To this end, for example, cloud computing, distributed computing, or client-server computing technology may be used.

Figure 2:
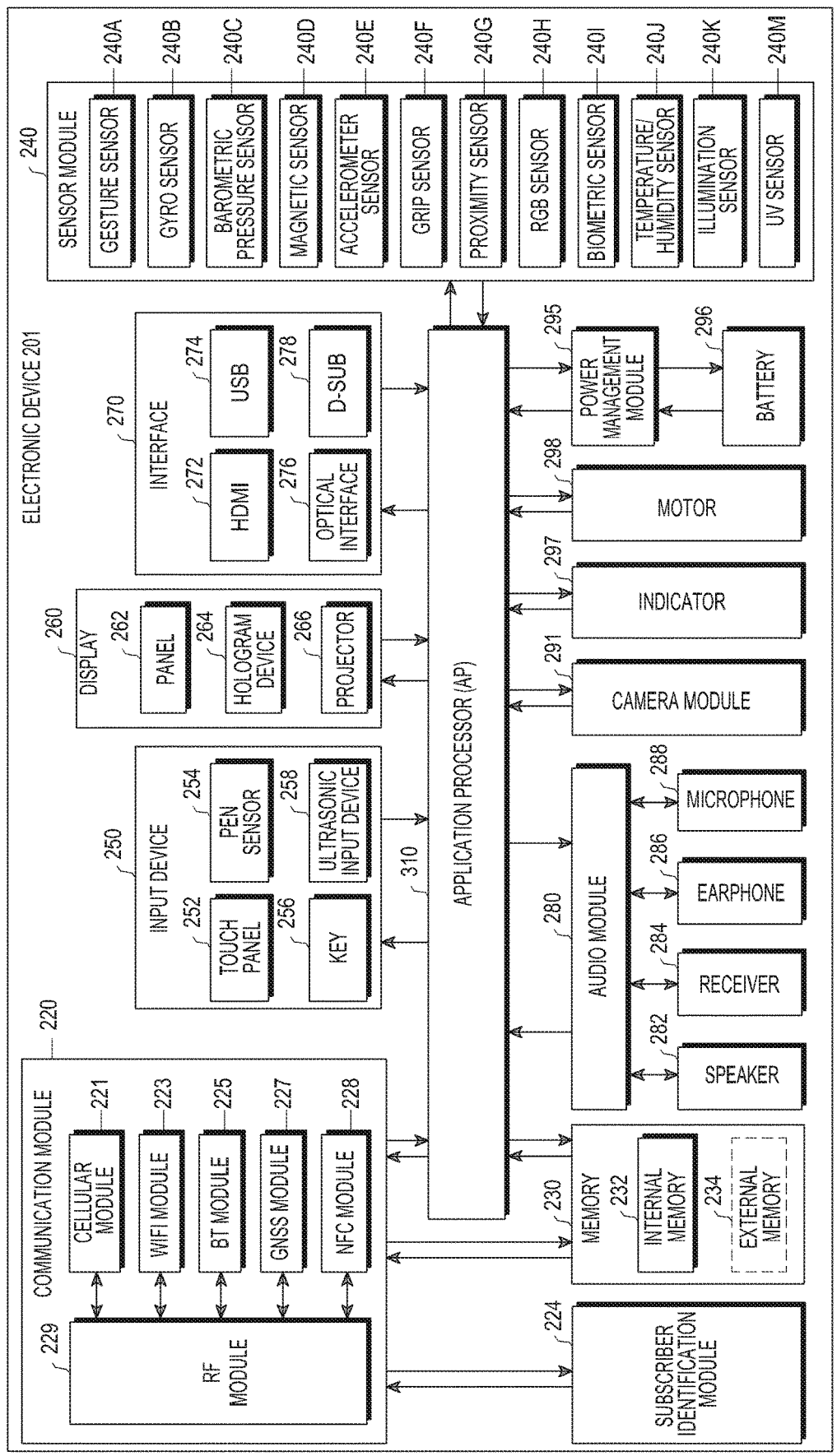
FIG. 2 is a block diagram illustrating an electronic device according to various embodiments of the present disclosure.

FIG. 2 is a block diagram of an electronic device 201 according to various embodiments. The electronic device 201 may include, for example, the whole or part of the electronic device 101 illustrated in FIG. 1. The electronic device 201 may include at least one processor 210 (for example, an AP), a communication module 220, a subscriber identification module 224, a memory 230, a sensor module 240, an input device 250, a display 260, an interface 270, an audio module 280, a camera module 291, a power management module 295, a battery 296, an indicator 297, and a motor 298. The processor 210 may control a plurality of hardware or software elements connected thereto and may perform various data processing and operations by driving an operating system or an application program. The processor 210 may be embodied, for example, as a System on Chip (SoC). According to an embodiment, the processor 210 may further include a graphic processing unit (GPU) and/or an image signal processor. The processor 210 may also include at least some (for example, a cellular module 221) of the elements illustrated in FIG. 2. The processor 210 may load, in a volatile memory, instructions or data received from at least one of the other elements (for example, a non-volatile memory), process the loaded instructions or data, and store the result data in the non-volatile memory.

The communication module 220 may have a configuration that is the same as, or similar to, that of the communication interface 170. The communication module 220 may include, for example, a cellular module 221, a WiFi module 223, a Bluetooth® module 225, a GNSS module 227, an NFC module 228, and an RF module 229. The cellular module 221 may provide, for example, a voice call, a video call, a text message service, an Internet service, and the like through a communication network. According to an embodiment, the cellular module 221 may identify and authenticate the electronic device 201 within a communication network using the subscriber identification module 224 (for example, a SIM card). According to an embodiment, the cellular module 221 may perform at least some of the functions that the processor 210 may provide. According to an embodiment, the cellular module 221 may include a communication processor (CP). According to some embodiments, at least some (for example, two or more) of the cellular module 221, the Wi-Fi module 223, the BT module 225, the GNSS module 227, and the NFC module 228 may be included in one Integrated Chip (IC) or IC package. The RF module 229, for example, may transmit/receive a communication signal (for example, an RF signal). The RF module 229 may include, for example, a transceiver, a power amp module (PAM), a frequency filter, a low noise amplifier (LNA), an antenna, and the like. According to another embodiment, at least one of the cellular module 221, the Wi-Fi module 223, the BT module 225, the GNSS module 227, and the NFC module 228 may transmit/receive an RF signal through a separate RF module. The subscriber identification module 224 may include, for example, a card that includes a subscriber identification module, or an embedded SIM, and may contain unique identification information (for example, an integrated circuit card identifier (ICCID)) or subscriber information (for example, international mobile subscriber identity (IMSI)).

The memory 230 (for example, the memory 130) may include, for example, an internal memory 232 or an external memory 234. The internal memory 232 may include, for example, at least one of a volatile memory (for example, a DRAM, an SRAM, an SDRAM, and the like) and a non-volatile memory (for example, a onetime programmable ROM (OTPROM), a PROM, an EPROM, an EEPROM, a mask ROM, a flash ROM, a flash memory, a hard disc drive, or a solid state drive (SSD)). The external memory 234 may include a flash drive, for example, a compact flash (CF), a secure digital (SD), a Micro-SD, a Mini-SD, an eXtreme digital (xD), a multi-media card (MMC), a memory stick, and the like. The external memory 234 may be functionally or physically connected to the electronic device 201 through various interfaces.

The sensor module 240 may, for example, measure a physical quantity or detect the operating state of the electronic device 201 and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a red, green, blue (RGB) sensor), a biometric sensor 240I, a temperature/humidity sensor 240J, a light sensor 240K, and a ultraviolet (UV) sensor 240M. Additionally or alternatively, the sensor module 240 may include, for example, an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In some embodiments, the electronic device 201 may further include a processor, which is configured to control the sensor module 240, as a part of the processor 210 or separately from the processor 210 in order to control the sensor module 240 while the processor 210 is in a sleep state.

The input device 250 may include, for example, a touch panel 252, a (digital) pen sensor 254, a key 256, or an ultrasonic input device 258. The touch panel 252 may use, for example, at least one of a capacitive type, a resistive type, an infrared type, and an ultrasonic type. Furthermore, the touch panel 252 may further include a control circuit. The touch panel 252 may further include a tactile layer to provide a tactile reaction to a user. The (digital) pen sensor 254 may include, for example, a recognition sheet that is a part of, or separate from, the touch panel. The key 256 may include, for example, a physical button, an optical key, or a keypad. The ultrasonic input device 258 may detect ultrasonic waves, which are generated by an input tool, through a microphone (for example, a microphone 288) to identify data corresponding to the detected ultrasonic waves.

The display 260 (for example, the display 160) may include a panel 262, a hologram device 264, a projector 266, and/or a control circuit for controlling them. The panel 262 may be implemented to be, for example, flexible, transparent, or wearable. The panel 262, together with the touch panel 252, may be configured as one or more modules. According to an embodiment, the panel 262 may include a pressure sensor (or a POS sensor) which may measure the strength of pressure of a user's touch. The pressure sensor may be implemented integrally with the touch panel 252 or implemented by one or more sensors separated from the touch panel 252. The hologram device 264 may show a three dimensional image in the air by using interference of light. The projector 266 may display an image by projecting light onto a screen. The screen may be located, for example, in the interior of, or on the exterior of, the electronic device 201. The interface 270 may include, for example, an HDMI 272, a USB 274, an optical interface 276, or a D-subminiature (D-sub) 278. The interface 270 may be included, for example, in the communication interface 170 illustrated in FIG. 1. Additionally or alternatively, the interface 270 may include, for example, a mobile high-definition link (MHL) interface, an SD card/multi-media card (MMC) interface, or an infrared data association (IrDA) standard interface.

The audio module 280, for example, may convert a sound into an electrical signal, and vice versa. At least some elements of the audio module 280 may be included, for example, in the input/output interface 145 illustrated in FIG. 1. The audio module 280 may process sound information that is input or output through, for example, a speaker 282, a receiver 284, earphones 286, the microphone 288, and the like. The camera module 291 is a device that can photograph a still image and a moving image. According to an embodiment, the camera module 291 may include one or more image sensors (for example, a front sensor or a rear sensor), a lens, an image signal processor (ISP), or a flash (for example, an LED or xenon lamp). The power management module 295 may manage, for example, the power of the electronic device 201. According to an embodiment, the power management module 295 may include a power management integrated circuit (PMIC), a charger IC, or a battery or fuel gauge. The PMIC may have a wired and/or wireless charging method. Examples of the wireless charging method may include a magnetic resonance method, a magnetic induction method, an electromagnetic wave method, and the like. Additional circuits (for example, a coil loop, a resonance circuit, a rectifier, and the like) for wireless charging may be further included. The battery gauge may measure, for example, a residual quantity of the battery 296, and a voltage, a current, or a temperature while charging. The battery 296 may include, for example, a rechargeable battery and/or a solar battery.

The indicator 297 may indicate a particular state (for example, a booting state, a message state, a charging state, and the like) of the electronic device 201 or a part (for example, the processor 210) thereof. The motor 298 may convert an electrical signal into a mechanical vibration and may generate a vibration, a haptic effect, and the like. The electronic device 201 may include a mobile TV support device that can process media data according to a standard, such as digital multimedia broadcasting (DMB), digital video broadcasting (DVB), MediaFlo®, and the like. Each of the above-described component elements of hardware according to the present disclosure may be configured with one or more components, and the names of the corresponding component elements may vary based on the type of electronic device. In various embodiments, an electronic device (for example, the electronic device 201) may omit some elements or may further include additional elements, or some of the elements of the electronic device may be combined with each other to configure one entity, in which case the electronic device may identically perform the functions of the corresponding elements prior to the combination.

Figure 3:
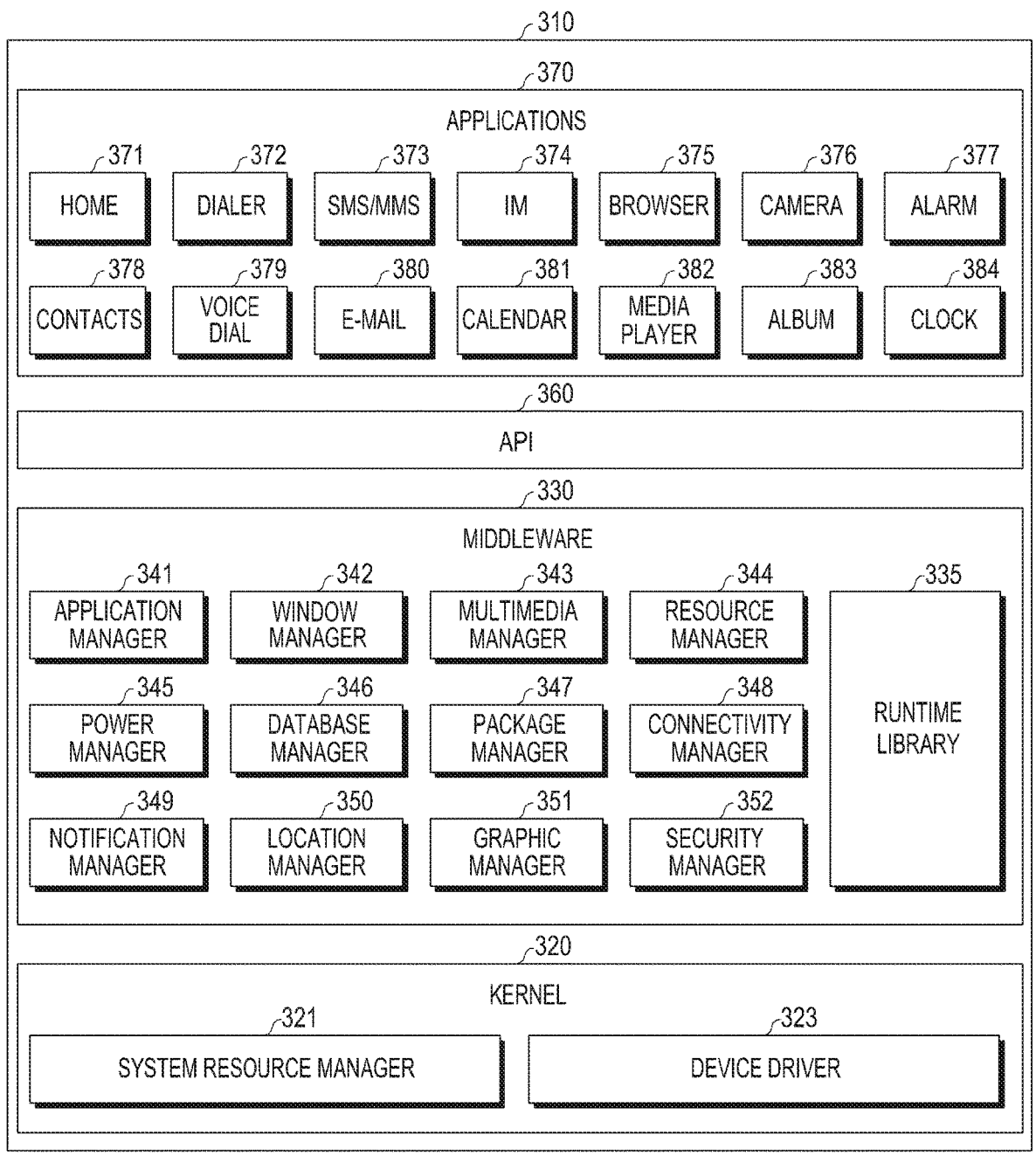
FIG. 3 is a block diagram illustrating a program module according to various embodiments of the present disclosure.

FIG. 3 is a block diagram of a program module according to various embodiments. According to an embodiment, the program module 310 (for example, the program 140) may include an Operating System (OS) that controls resources relating to an electronic device (for example, the electronic device 101) and/or various applications (for example, the application programs 147) that are driven on the operating system. The operating system may include, for example, Android™, iOS™, Windows™, Symbian™, Tizen™, or Bada™. Referring to FIG. 3, the program module 310 may include a kernel 320 (for example, the kernel 141), middleware 330 (for example, the middleware 143), an API 360 (for example, the API 145), and/or applications 370 (for example, the application programs 147). At least a part of the program module 310 may be preloaded on the electronic device, or may be downloaded from an external electronic device (for example, the electronic device 102 or 104 or the server 106).

The kernel 320 may include, for example, a system resource manager 321 and/or a device driver 323. The system resource manager 321 may control, allocate, or retrieve system resources. According to an embodiment, the system resource manager 321 may include a process manager, a memory manager, or a file system manager. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver. For example, the middleware 330 may provide a function required by the applications 370 in common, or may provide various functions to the applications 370 through the API 360 to enable the applications 370 to use the limited system resources within the electronic device. According to an embodiment, the middleware 330 may include at least one of a runtime library 335, an application manager 341, a window manager 342, a multi-media manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses in order to add a new function through a programming language while the applications 370 are being executed. The runtime library 335 may manage an input/output, manage a memory, or process an arithmetic function. The application manager 341 may manage, for example, the life cycles of the applications 370. The window manager 342 may manage GUI resources used for a screen. The multimedia manager 343 may identify formats required for reproducing various media files and may encode or decode a media file using a codec suitable for the corresponding format. The resource manager 344 may manage the source codes of the applications 370 or the space of a memory. The power manager 345 may manage, for example, the capacity or power of a battery and may provide power information required for operating the electronic device. According to an embodiment, the power manager 345 may operate in conjunction with a basic input/output system (BIOS). The database manager 346 may, for example, generate, search, or change databases to be used by the applications 370. The package manager 347 may manage the installation or update of an application that is distributed in the form of a package file.

The connectivity manager 348 may manage, for example, a wireless connection. The notification manager 349 may provide an event (for example, an arrival message, an appointment, a proximity notification, and the like) to a user. The location manager 350 may manage, for example, the location information of the electronic device. The graphic manager 351 may manage, for example, a graphic effect to be provided to a user, or a user interface relating thereto. The security manage 352 may provide, for example, system security or user authentication. According to an embodiment, the middleware 330 may include a telephony manager for managing a voice or video call function of the electronic device or a middleware module that is capable of forming a combination of the functions of the above-described elements. According to an embodiment, the middleware 330 may provide specialized modules according to the types of operation systems. The middleware 330 may dynamically remove some of the existing elements, or may add new elements. The API 360 is, for example, a set of API programming functions, and may be provided with different configurations according to operating systems. For example, if an operating system such as Android® or iOS®, each platform may be provided with one API set, whereas with the Tizen®, each platform may be provided with two or more API sets.

The applications 370 may include, for example, one or more applications that can perform functions, such as home 371, dialer 372, SMS/MMS 373, instant message (IM) 374, browser 375, camera 376, alarm 377, contacts 378, voice dial 379, e-mail 380, calendar 381, media player 382, album 383, watch 384, health care (for example, measuring exercise quantity or blood glucose), providing of environment information (for example, atmospheric pressure, humidity, or temperature information), and the like. According to an embodiment, the applications 370 may include an information exchange application that can support the exchange of information between the electronic device and an external electronic device. The information exchange application may include, for example, a notification relay application for relaying particular information to an external electronic device or a device management application for managing an external electronic device. For example, the notification relay application may relay notification information generated in the other applications of the electronic device to an external electronic device, or may receive notification information from an external electronic device to provide the received notification information to a user. The device management application may install, delete, or update functions of an external electronic device that communicates with the electronic device (for example, turning on/off the external electronic device itself (or some elements thereof) or adjusting the brightness (or resolution) of a display) or applications executed in the external electronic device. According to an embodiment, the applications 370 may include applications (for example, a health care application of a mobile medical appliance) that are designated according to the attributes of an external electronic device. According to an embodiment, the applications 370 may include applications received from an external electronic device. At least a part of the program module 310 may be implemented (for example, executed) by software, firmware, hardware (for example, processor 210), or a combination of at least two thereof, and may include a module, a program, a routine, an instruction set, or a process for performing one or more functions.

The term "module" as used herein may include a unit consisting of hardware, software, or firmware, and may, for example, be used interchangeably with the term "logic", "logical block", "component", "circuit", or the like. The "module" may be an integrated component, or a minimum unit for performing one or more functions or a part thereof. The "module" may be mechanically or electronically implemented and may include, for example, an Application-Specific Integrated Circuit (ASIC) chip, a Field-Programmable Gate Arrays (FPGA), or a programmable-logic device, which has been known or are to be developed in the future, for performing certain operations. At least some of devices (e.g., modules or functions thereof) or methods (e.g., operations) according to various embodiments may be implemented by an instruction which is stored a computer-readable storage medium (e.g., the memory 130) in the form of a program module. The instruction, when executed by a processor (e.g., the processor 120), may cause the one or more processors to execute the function corresponding to the instruction. The computer-readable storage medium may include a hard disk, a floppy disk, a magnetic medium (e.g., a magnetic tape), an Optical Media (e.g., CD-ROM, DVD), a Magneto-Optical Media (e.g., a floptical disk), an inner memory, etc. The instruction may include a code which is made by a compiler or a code which may be executed by an interpreter. The programming module according to the present disclosure may include one or more of the aforementioned components or may further include other additional components, or some of the aforementioned components may be omitted. Operations performed by a module, a programming module, or other elements according to various embodiments may be executed sequentially, in parallel, repeatedly, or in a heuristic manner. At least some operations may be executed according to another sequence, may be omitted, or may further include other operations.

Figure 4:
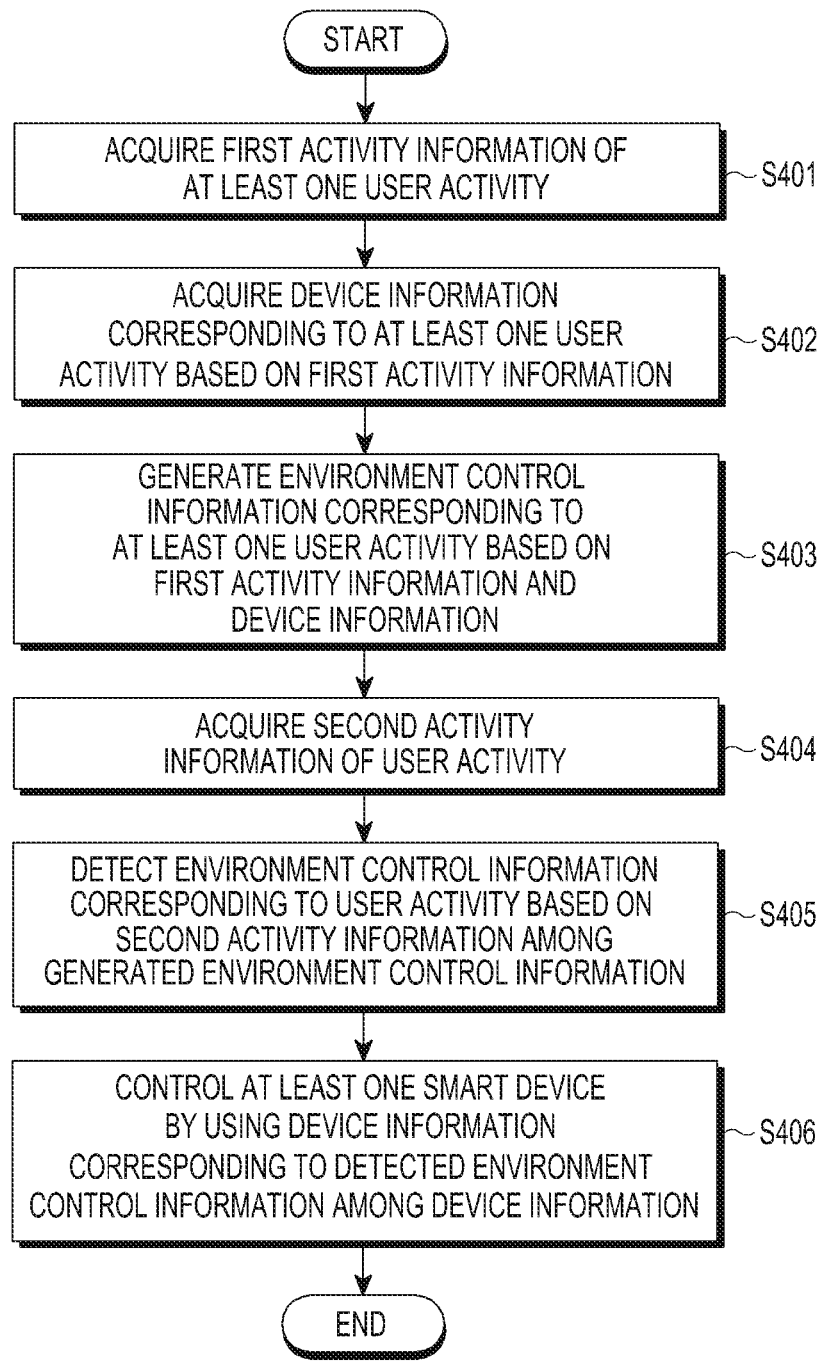
FIG. 4 is a flowchart illustrating a method of controlling a user environment by a server according to various embodiment of the present disclosure.

FIG. 4 is a flowchart illustrating a method of controlling a user environment by a server according to various embodiments of the present disclosure.

As illustrated in FIG. 4, according to various embodiments, a server (for example, the server 106) may acquire first behavior information related to at least one user activity in operation S401. For example, at least one user activity may include exercising, studying, sleeping, cooking, and cleaning.

For example, the first behavior information may include type information of the user's behavior, time information when the user activity is conducted, and the user's biometric signal information when the user activity is conducted.

According to various embodiments, the server 106 may acquire the first activity information of at least one user activity from the electronic device (for example, electronic device 101) or at least one smart device (for example, smart device 104). For example, the electronic device 101 may include a smart phone and a wearable watch. For example, at least one smart device 104 may include the electronic device 101 and/or home appliances (for example, home appliance based on Internet of Things (IoT) technology) which can communicate with the server 106.

According to various embodiments, the electronic device 101 may detect at least one user activity. For example, when a user input is received by the electronic device 101, the electronic device 101 may detect at least one user activity based on the received user input. For example, when an execution command for a specific application among at least one application stored in the electronic device 101 is received, the electronic device 101 may acquire a type of the specific application based on the execution command for the specific application and detect whether the user activity is exercise, study, sleep, cooking, and cleaning based on the acquired type of the application. For example, the electronic device 101 may detect at least one user activity based on the user input (for example, study time, cleaning time, and cooking time) within the executed specific application. According to various embodiments, the electronic device 101 may detect at least one user activity and generate first activity information based on at least one detected user activity. According to various embodiments, the electronic device 101 may transmit the generated first activity information to the server 106.

For example, the electronic device 101 may detect that the user activity corresponds to the "exercise" based on an execution command for an application of a category related to health and/or exercise among the applications stored in the electronic device 101 and a data input log of the executed application.

For example, the electronic device 101 may detect that the user activity corresponds to "rest" based on an execution command for an application of a category related to a lifestyle, health, exercise, and/or rest among the applications stored in the electronic device 101 and a data input log of the executed application.

For example, the electronic device 101 may detect that the user activity corresponds to "sleep" based on an execution command for an application of a category related to health, exercise, and/or sleep among the applications stored in the electronic device 101 and a data input log of the executed application.

For example, the electronic device 101 may detect that the user activity corresponds to "sleeplessness" based on an execution command for an application of a category related to health, exercise, and/or sleep among the applications stored in the electronic device 101 and a data input log of the executed application.

For example, the electronic device 101 may detect that the user activity corresponding to "study" based on an execution command for an application of a category related to an education, study, and/or schedule management among the applications stored in the electronic device 101 and a data input log of the executed application.

For example, the electronic device 101 may detect that the user activity corresponds to "party" based on an execution command for an application of a category related to an entertainment, party, and/or schedule management among the applications stored in the electronic device 101 and a data input log of the executed application.

According to various embodiments, the smart device 104 may receive a power on command from the user and, after receiving the power on command, may receive a command for performing a particular function from the user and detect at least one user activity based on the power on command and/or the command for performing the particular function. For example, the smart device 104 may include a cleaner and, when the user inputs a power on command and a command for performing cleaning for the cleaner, detect that the user activity corresponds to the "cleaning". For example, the smart device 104 may include a speaker and, when the user inputs a power on command and a command for reproducing a first sound source for the speaker, detect that the user activity corresponds to "listening to music". According to various embodiments, the smart device 104 may generate first activity information based on at least one detected user activity. According to various embodiments, the smart device 104 may transmit the generated first activity information to the server 106.

For example, the server 106 may acquire first activity information of which the user activity corresponds to "exercise" based on an operation command for IoT exercise equipment including a running machine and an X-bike.

For example, the server 106 may acquire first activity information of which the user activity corresponds to "rest" based on a control command for dimming and/or a color of a bulb, an on off command for the speaker, and an input for a reproduced sound source.

For example, the server 106 may acquire first activity information of which the user activity corresponds to "sleep" based on a control command for dimming and/or a color of a bulb and an on/off command for an alarm clock.

For example, the server 106 may acquire first activity information of which the user activity corresponds to "sleeplessness" based on a control command for dimming and/or a color of a bulb and an on/off command for an alarm clock.

For example, the server 106 may acquire first activity information of which the user activity corresponds to "study" based on a desk, a chair, and/or an on/off command for desk lighting.

For example, the server 106 may acquire first activity information of which the user activity corresponds to "party" based on an on/off command for the speaker and/or a sound source reproducing command for the speaker.

According to various embodiments, in operation S402, the server 106 may acquire device information corresponding to at least one user activity based on the acquired first activity information.

According to various embodiments, the server 106 may identify at least one user activity corresponding to the first activity information and acquire device information corresponding to each of at least one user activity.

According to various embodiments, the server 106 may acquire device information corresponding to at least one user activity from at least one smart device 104 based on the first activity information. For example, the server 106 may identify at least one user activity corresponding to the first activity information after acquiring the first activity information and make a request for device information corresponding to each of at least one user activity to at least one smart device 104. For example, the server 106 may identify at least one user activity corresponding to the first activity information after acquiring the first activity information and receive device information corresponding to each of at least one user activity from at least one smart device 104 on every preset period.

According to various embodiments, the device information may include operation state information of the smart device 104. For example, the operation state information may include temperature information, humidity information, wind information, and air quality information of the smart device 104 (for example, air-conditioning device). For example, the operation state information may include reproduced music, illumination, a color, and scent information of the smart device 104 (for example, IoT home appliance).

According to various embodiments, in operation S403, the server 106 may generate environment control information corresponding to at least one user activity based on the first activity information and the device information.

For example, the environment control information may include a control command for controlling at least one smart device 104. For example, the control command may include a device control command for detecting device information corresponding to acquired activity information corresponding to a specific user activity and controlling the smart device 104 based on the detected device information.

For example, the environment control information may include a user activity, device information corresponding to the user activity, weather information corresponding to the user activity, time information corresponding to the user activity, and information on a place where the user corresponding to the user activity is located.

According to various embodiments, in operation S404, after the environment control information is generated, the server 106 may acquire second activity information related to a user activity.

For example, after the environment control information is generated, the server 106 may acquire the second activity information corresponding to the user activity detected by the electronic device 101 and/or the smart device 104 from the electronic device 101 and/or the smart device 104.

According to various embodiments, in operation S405, the smart device 104 may detect environment control information corresponding to the user activity based on the second activity information among the generated environment control information.

For example, the smart device 104 may identify the user activity related to the acquired second activity information and detect environment control information corresponding to the identified user activity. For example, when the user activity corresponds to "exercise", environment control information corresponding to "exercise" may be detected in the pre-generated environment control information. For example, the environment control information corresponding to "exercise" may include operation information of the smart device 104 when the user "exercises", for example, reproduced music information, and may include temperature information, humidity information, wind information, and/or air quality information when the user "exercises".

According to various embodiments, in operation S406, the server 106 may control at least one smart device by using device information corresponding to the detected environment control information among the device information.

For example, when the device information corresponding to the detected environment control information includes information indicating that "reproduced music information of the speaker corresponds to a first sound source", the server 106 may reproduce the "first sound source" through the speaker among at least one smart device by using the device information indicating that "the reproduced music information of the speaker corresponds to the first sound source". For example, the server 106 may transmit a control command for reproducing the "first sound source" to the speaker among at least one smart device by using the device information indicating that "the reproduced music information of the speaker corresponds to the first sound source".

Figure 5:
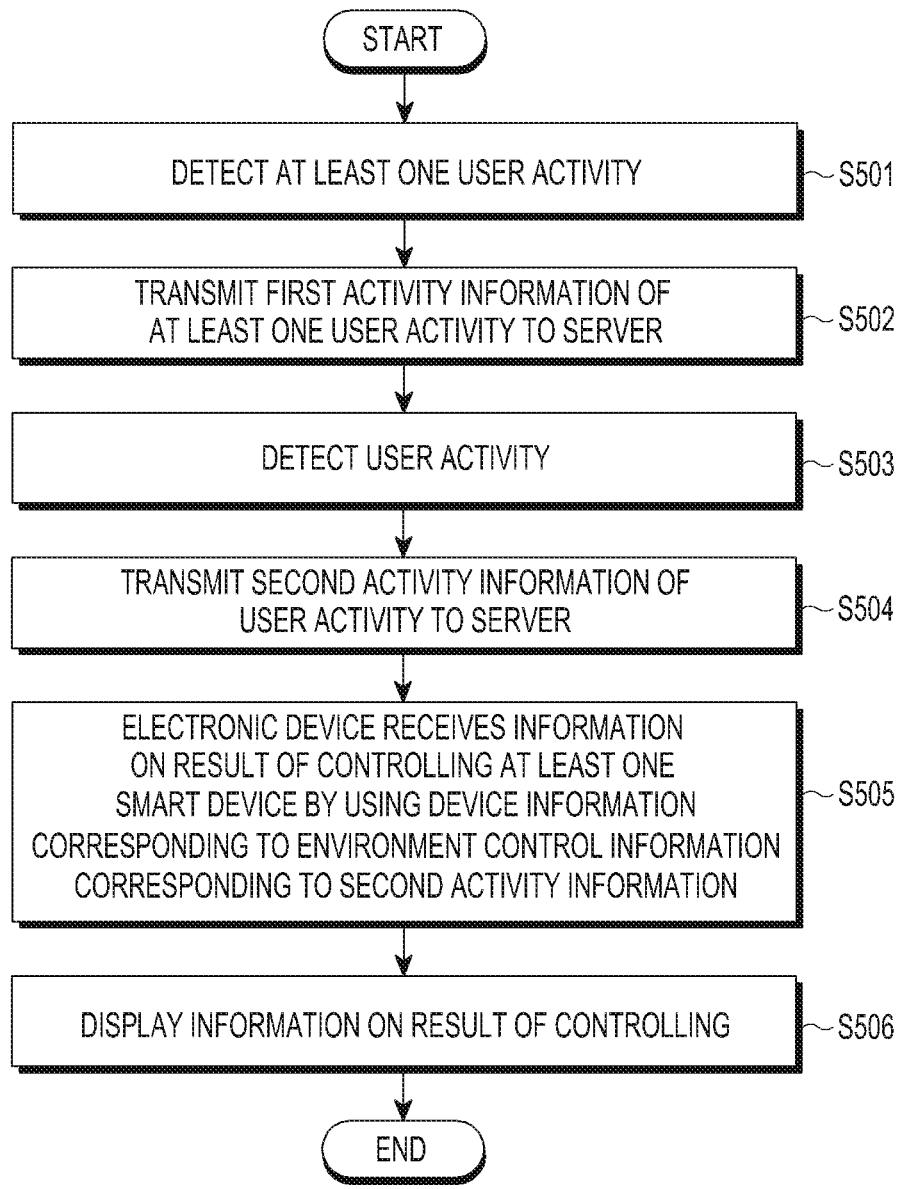
FIG. 5 is a flowchart illustrating a method of controlling a user environment using an electronic device according to various embodiments of the present disclosure.

FIG. 5 is a flowchart illustrating a method of controlling a user environment using an electronic device according to various embodiments of the present disclosure.

As illustrated in FIG. 5, according to various embodiments, the electronic device (for example, electronic device 101) may detect at least one user activity in operation S501.

According to various embodiments, in operation S502, the electronic device 101 may generate first activity information related to at least one detected user activity and transmit the generated first activity information to the server (for example, server 106).

According to various embodiments, in operation S503, the electronic device 101 may detect a user activity.

For example, the user activity detected in operation S503 may be an activity different from at least one user activity detected in operation S501. For example, at least one user activity detected in operation S501 may be a user activity for generating environment control information, and the user activity detected in operation S503 may be an activity that is newly detected after the generation of the environment control information and detects one of the environment control information.

According to various embodiments, in operation S504, the electronic device 101 may transmit the second activity information of the user activity to the server 106.

For example, the server 106 may acquire device information from the electronic device 101 and/or the smart device 104 based on the first activity information, generate environment control information based on the first activity information and the device information, detect environment control information corresponding to the second activity information, and control at least one smart device by using device information corresponding to the detected environment control information.

According to various embodiments, in operation S505, the electronic device 101 may receive information related to a result of controlling at least one smart device 104 by the server 106 using the device information corresponding to the environment control information corresponding to the second activity information.

According to various embodiments, in operation S506, the electronic device 101 may display information on the result of the control.

Figure 6:
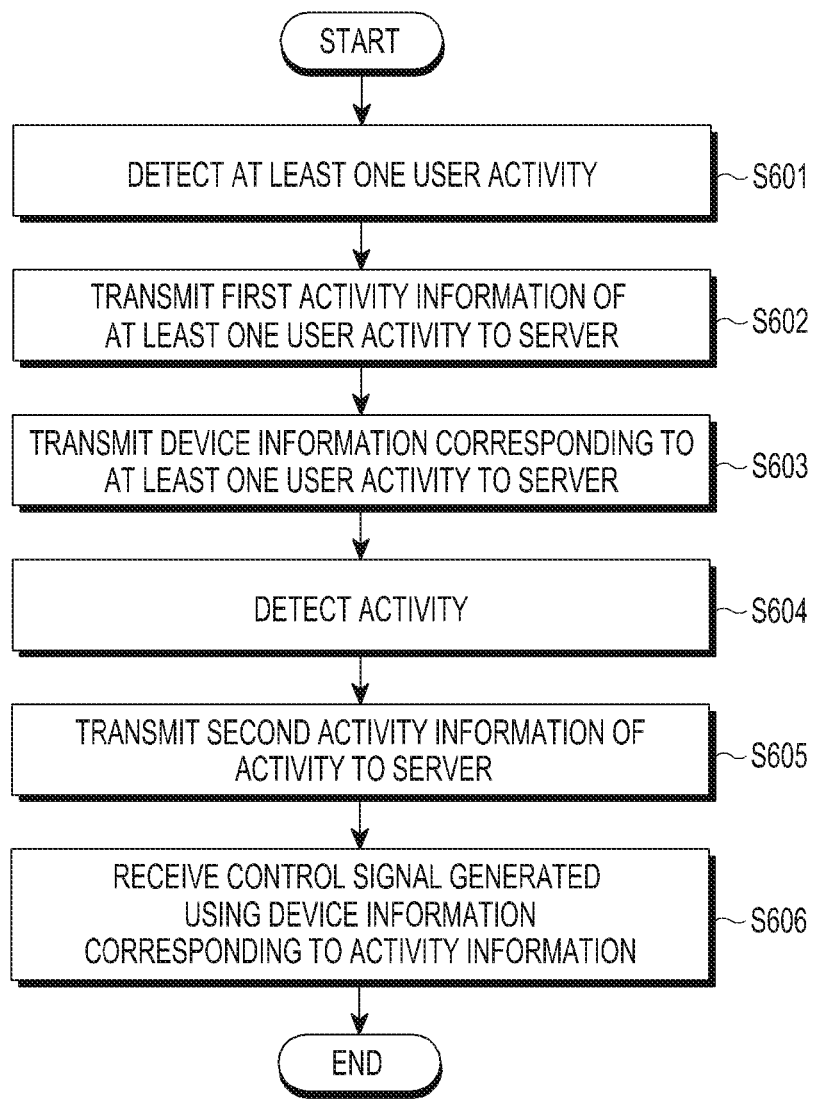
FIG. 6 is a flowchart illustrating a method of controlling a user environment using at least one smart device according to various embodiments of the present disclosure.

FIG. 6 is a flowchart illustrating a method of controlling a user environment using at least one smart device according to various embodiments of the present disclosure.

As illustrated in FIG. 6, according to various embodiments, at least one smart device (for example, the smart device 104) may detect at least one user activity in operation S601.

According to various embodiments, in operation S602, at least one smart device 104 may transmit first activity information of at least one user activity to the server (for example, the server 106).

According to various embodiments, in operation S603, at least one smart device 104 may transmit device information corresponding to at least one user activity to the server.

According to various embodiments, in operation S604, at least one smart device 104 may detect a user activity.

According to various embodiments, in operation S605, at least one smart device 104 may transmit second activity information of the detected user activity to the server 106.

According to various embodiments, in operation S606, at least one smart device 104 may receive a control signal generated using device information corresponding to the user activity information from the server 106.

Figure 7:
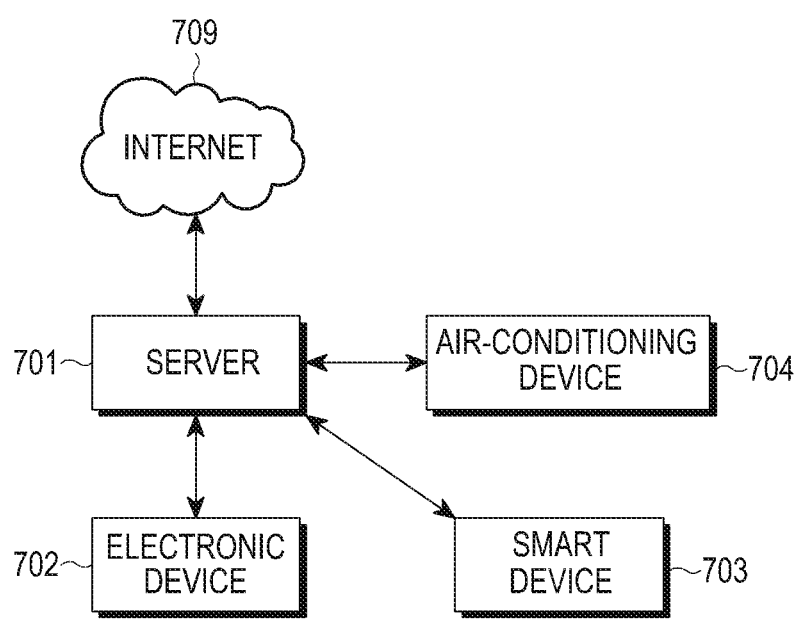
FIG. 7 illustrates a user environment control system according to various embodiments of the present disclosure.

FIG. 7 illustrates a user environment control system according to various embodiments of the present disclosure.

As illustrated in FIG. 7, according to various embodiments, the user environment control system may include Internet 709, a server 701, an electronic device 702, an air-conditioning device 704, and a smart device 703.

According to various embodiments, the server 701 may be a smart home hub or a smart home server which can be located within a space including the electronic device 702, the air-conditioning device 704, and the smart device 703.

According to various embodiments, the server 701 may acquire first activity information of at least one user activity from the electronic device 702 and/or the smart device 703.

According to various embodiments, the server 701 may acquire device information from the smart device 703 and/or the air-conditioning device 704.

According to various embodiments, the server 701 may generate environment control information corresponding to each of at least one user activity for the first activity information based on the first activity information and the device information.

According to various embodiments, the server 701 may generate the environment control information and correct the generated environment control information by using the control information received from the Internet 709.

According to various embodiments, the server 701 may acquire second activity information of the user activity from the electronic device 702 and/or the smart device 703.

According to various embodiments, the server 701 may detect environment control information corresponding to the user activity for the second activity information among the environment control information corresponding to at least one user activity for the first activity information based on the second activity information.

According to various embodiments, the server 701 may control at least one smart device 703 and/or the air-conditioning device 704 by using device information corresponding to the detected environment control information corresponding to the user activity for the second activity information.

Figure 8:
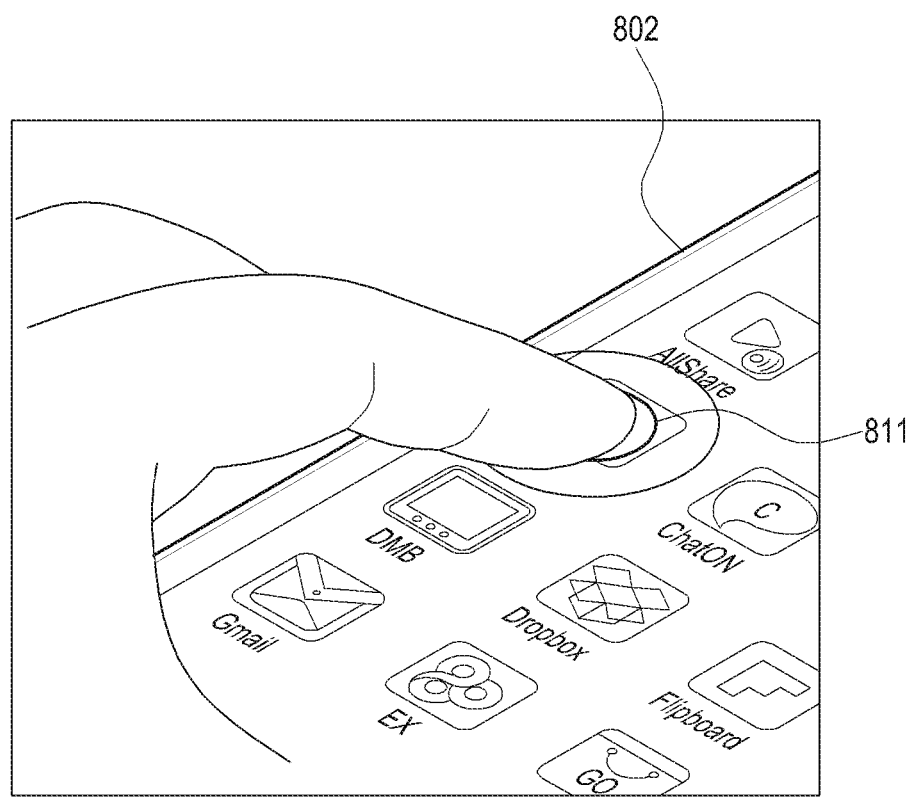
FIG. 8 illustrates a method of acquiring first activity information through an electronic device according to an embodiment of the present disclosure.

FIG. 8 illustrates a method of acquiring first activity information through an electronic device according to an embodiment of the present disclosure.

As illustrated in FIG. 8, according to various embodiments, an electronic device 802 may include a smart phone.

According to various embodiments, the electronic device 802 may display at least one piece of application information (for example, an application icon) on the display of the electronic device 802.

According to various embodiments, the electronic device 802 may receive selection of particular application information 811 in at least one displayed piece of application information.

According to various embodiments, the electronic device 802 may detect a kind (for example, a type) of the application corresponding to the selected particular piece of application information 811 and detect a user activity based on the detected type of the application.

According to various embodiments, after detecting the user activity based on the type of the selected application, the electronic device 802 may generate first activity information (for example, recording information on the selection of the particular application information 811) of the detected user activity and transmit the generated first activity information to the server (for example, the server 701).

Figure 9:
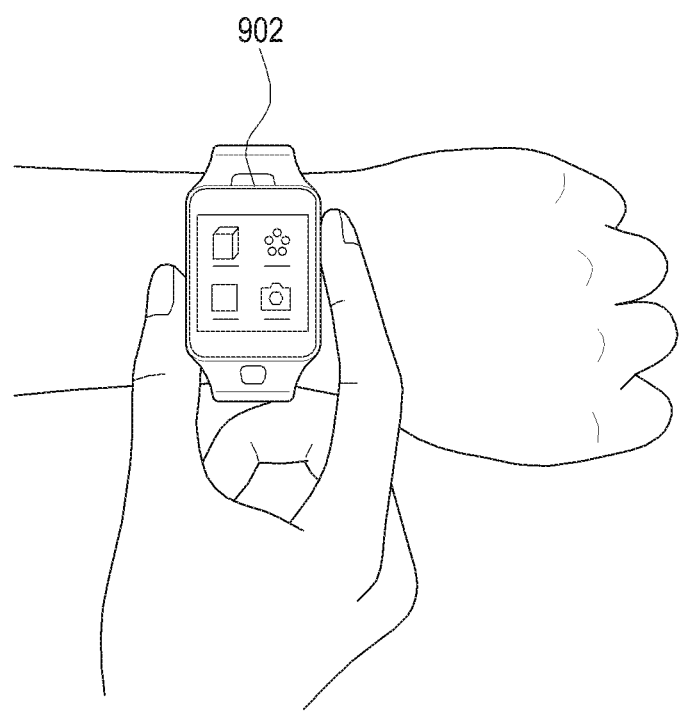
FIG. 9 illustrates a method of acquiring first activity information through an electronic device according to an embodiment of the present disclosure.

FIG. 9 illustrates a method of acquiring first activity information through an electronic device according to an embodiment of the present disclosure.

As illustrated in FIG. 9, according to various embodiments, an electronic device 902 may include a wearable watch 902.

According to various embodiments, the electronic device 902 may display at least one application information (for example, an application icon) on the display of the electronic device 902.

According to various embodiments, the electronic device 902 may receive selection of particular application information among at least one piece of displayed application information.

According to various embodiments, the electronic device 902 may detect a kind (for example, a type) of the application corresponding to the selected particular application information and detect a user activity based on the detected type of the application.

According to various embodiments, after detecting the user activity based on the type of the selected application, the electronic device 902 may generate first activity information of the detected user activity (for example, recording information of the selection of the particular application information) and transmit the generated first activity information to the server (for example, the server 701).

Figure 10:
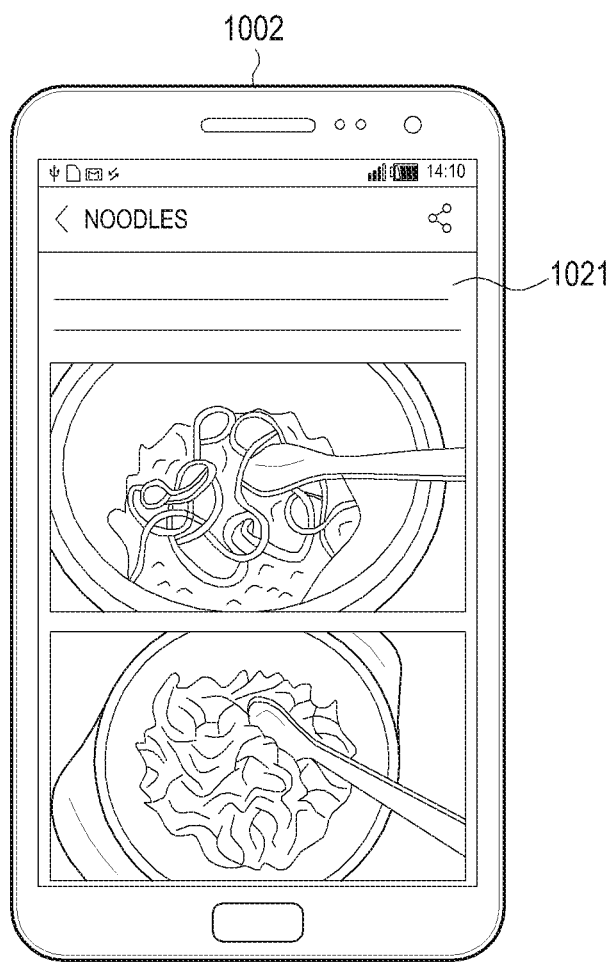
FIG. 10 illustrates a method of acquiring first activity information through an electronic device according to an embodiment of the present disclosure.

FIG. 10 illustrates a method of acquiring first activity information through an electronic device according to an embodiment of the present disclosure.

As illustrated in FIG. 10, according to various embodiments, an electronic device 1002 may execute a particular application based on a user command.

According to various embodiments, the electronic device 1002 may execute the particular application based on the user command and display an execution screen 1021 of the executed particular application on the display.

According to various embodiments, the electronic device 1002 may identify that the type of the executed application corresponds to a "cooking" related application based on information included in the execution screen 1021 of the particular application (for example, images including noodle) and detect that the user activity corresponds to "cooking" based on the identified "cooking" related application.

According to various embodiments, after detecting that the user activity corresponds to "cooking", the electronic device 1002 may transmit first activity information of the user activity to the server (for example, the server 701).

Figure 11:
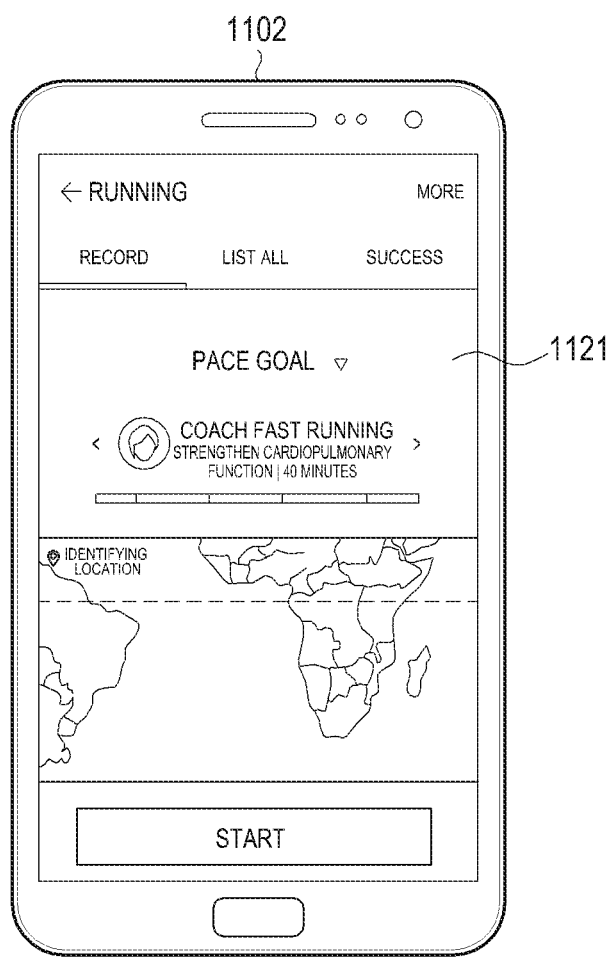
FIG. 11 illustrates a method of acquiring first activity information through an electronic device according to an embodiment of the present disclosure.

FIG. 11 illustrates a method of acquiring first activity information through an electronic device according to an embodiment of the present disclosure.

As illustrated in FIG. 11, according to various embodiments, an electronic device 1102 may execute a particular application based on a user command. According to various embodiments, the electronic device 1102 may execute the particular application based on the user command and display an execution screen 1121 of the executed particular application on the display.

According to various embodiments, the electronic device 1102 may identify that the type of the executed application corresponds to an "exercise" related application based on information included in the execution screen 1121 of the particular application (for example, "running", "pace goal", "coach fast running") and detect that the user activity corresponds to "exercise" based on the identified "exercise" related application.

According to various embodiments, after detecting that the user activity corresponds to "exercise" the electronic device 1102 may transmit first activity information of the user activity to the server (for example, the server 701).

Figure 12:
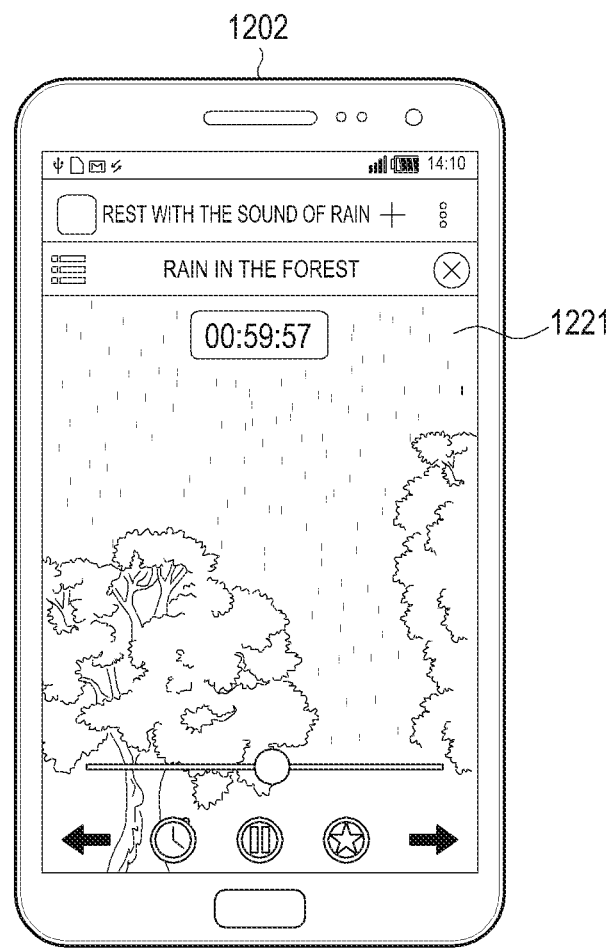
FIG. 12 illustrates a method of acquiring first activity information through an electronic device according to an embodiment of the present disclosure.

FIG. 12 illustrates a method of acquiring first activity information through an electronic device according to an embodiment of the present disclosure.

As illustrated in FIG. 12, according to various embodiments, an electronic device 1202 may execute a particular application based on a user command. According to various embodiments, the electronic device 1202 may execute the particular application based on the user command and display an execution screen 1221 of the executed particular application on the display.

According to various embodiments, the electronic device 1202 may identify that the type of the executed application corresponds to a "rest" related application based on information included in the execution screen 1221 of the particular application (for example, "rest with the sound of rain . . . ", "rain in the forest", and the like), and detect that the user activity corresponds to "rest" based on the identified "rest" related application.

According to various embodiments, after detecting that the user activity corresponds to "rest", the electronic device 1202 may transmit first activity information of the user activity to the server (for example, the server 701).

Figure 13:
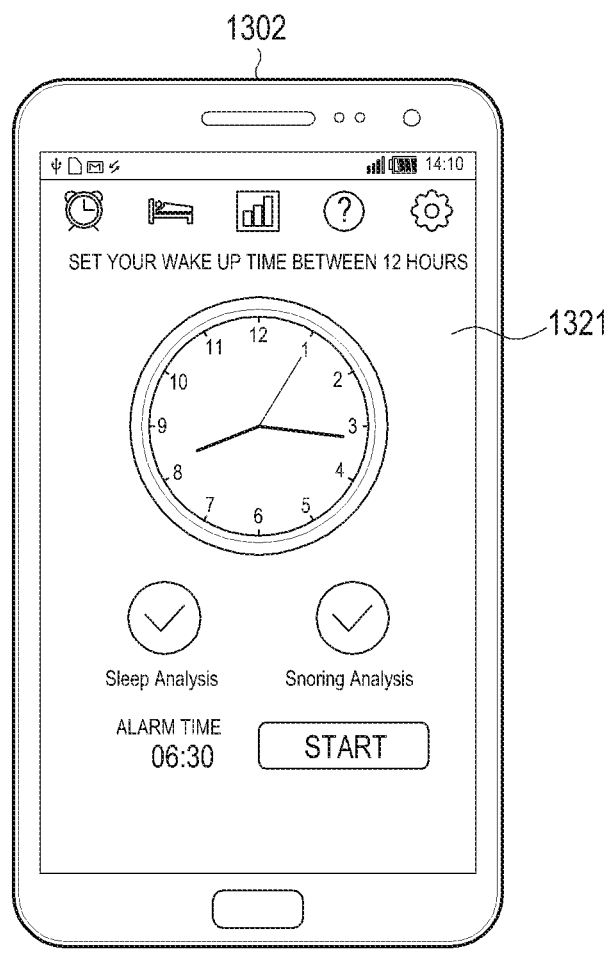
FIG. 13 illustrates a method of acquiring first activity information through an electronic device according to an embodiment of the present disclosure.

FIG. 13 illustrates a method of acquiring first activity information through an electronic device according to an embodiment of the present disclosure.

As illustrated in FIG. 13, according to various embodiments, an electronic device 1302 may execute a particular application based on a user command. According to various embodiments, the electronic device 1302 may execute the particular application based on the user command and display an execution screen 1321 of the executed particular application on the display.

According to various embodiments, the electronic device 1302 may identify that the type of the executed application corresponds to a "sleep" related application based on information included in the execution screen 1321 of the particular application (for example, "SET YOUR WAKE UP TIME BETWEEN 12 HOURS", "sleep analysis", "snoring analysis", "alarm time", and the like) and detect that the user activity corresponds to "sleep" based on the identified "sleep" related application.

According to various embodiments, after detecting that the user activity corresponds to "sleep", the electronic device 1302 may transmit first activity information of the user activity to the server (for example, the server 701).

Figure 14A:
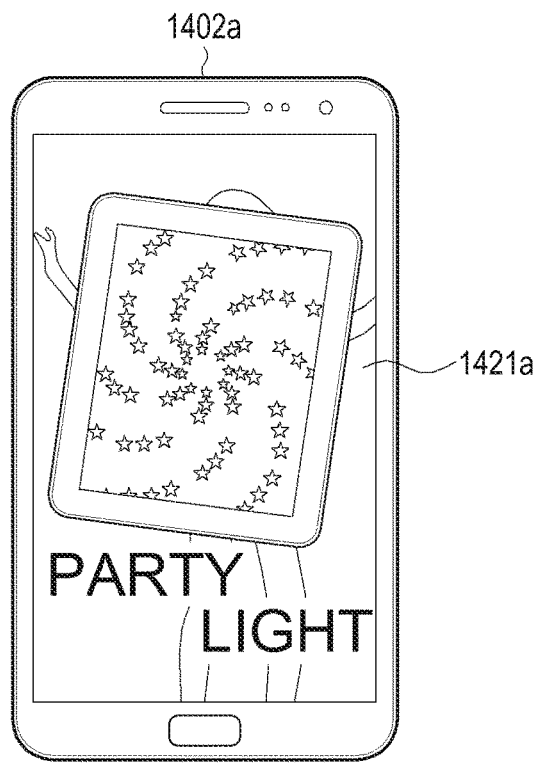
FIGS. 14A and 14B illustrate a method of acquiring first activity information through an electronic device according to an embodiment of the present disclosure.

FIG. 14A illustrates a method of acquiring first activity information through an electronic device according to an embodiment of the present disclosure.

As illustrated in FIG. 14A, according to various embodiments, an electronic device 1402a may execute a particular application based on a user command. According to various embodiments, the electronic device 1402a may execute the particular application based on the user command and display an execution screen 1421a of the executed particular application on the display.

According to various embodiments, the electronic device 1402a may identify that the type of the executed application corresponds to a "party" related application based on information included in the execution screen 1421a of the particular application (for example, "party light", "start shape", and the like) and detect that the user activity corresponds to "party" based on the identified "party" related application.

According to various embodiments, after detecting that the user activity corresponds to "party", the electronic device 1402a may transmit first activity information of the user activity to the server (for example, the server 701).

Figure 14B:
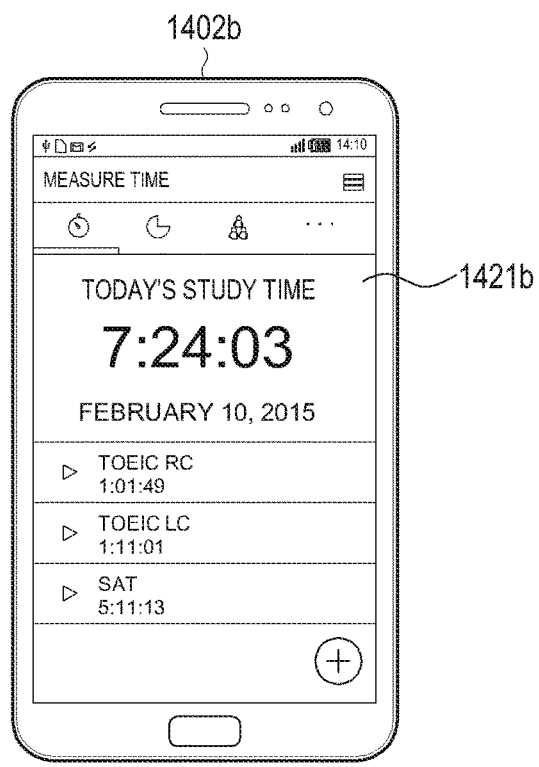

FIG. 14B illustrates a method of acquiring first activity information through an electronic device according to an embodiment of the present disclosure.

According to various embodiments, the electronic device 1402b may execute a particular application based on a user command. According to various embodiments, the electronic device 1402b may execute the particular application based on the user command and display an execution screen 1421b of the executed particular application on the display.

According to various embodiments, the electronic device 1402b may identify that the type of the executed application corresponds to a "study" related application based on information included in the execution screen 1421b of the particular application (for example, "today's study time", "TOEIC RC", "TOEIC LC", "SAT", and the like), and detect that the user activity corresponds to "study" based on the identified "study" related application. According to various embodiments, after detecting that the user activity corresponds to "study", the electronic device 1402b may transmit first activity information of the user activity to the server (for example, the server 701).

Figure 15:
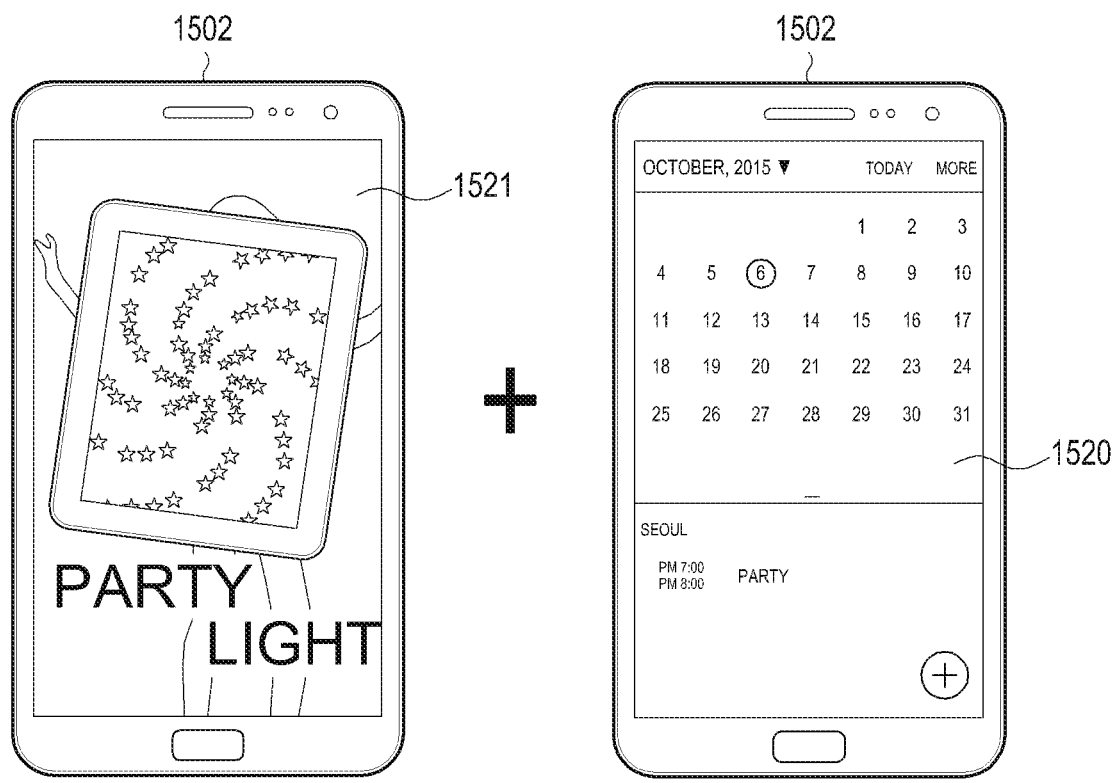
FIG. 15 illustrates a method of acquiring first activity information through an electronic device according to an embodiment of the present disclosure.

FIG. 15 illustrates a method of acquiring first activity information through an electronic device according to an embodiment of the present disclosure.

As illustrated in FIG. 15, according to various embodiments, an electronic device 1502 may execute a particular application based on a user command. According to various embodiments, the electronic device 1502 may execute the particular application based on the user command and display an execution screen 1521 of the executed particular application on the display.

According to various embodiments, the electronic device 1502 may identify that the type of the executed application corresponds to a "party" related application based on information included in the execution screen 1521 of the particular application (for example, "party light", "start shape", and the like) and detect that the user activity corresponds to "party" based on the identified "party" related application.

According to various embodiments, the electronic device 1502 may correct the user activity detected based on the execution screen 1521 of the particular application on the basis of information 1520 input into a schedule management application. For example, after detecting that the user activity corresponds to "party" based on the execution screen 1521 of the "party" related application, the electronic device 1502 may make a correction and/or determination based on the schedule information 1520 ("party from 7 p.m. to 8 p.m.") input into the schedule management application. For example, after detecting that the user activity corresponds to "party" based on the execution screen 1521 of the "party" related application, the electronic device 1502 may insert the fact that the activity corresponding to "party" is conducted from 7 p.m. to 8 p.m. into first activity information based on the schedule information 1520 ("party from 7 p.m. to 8 p.m.") input into the schedule management application.

Figure 16:
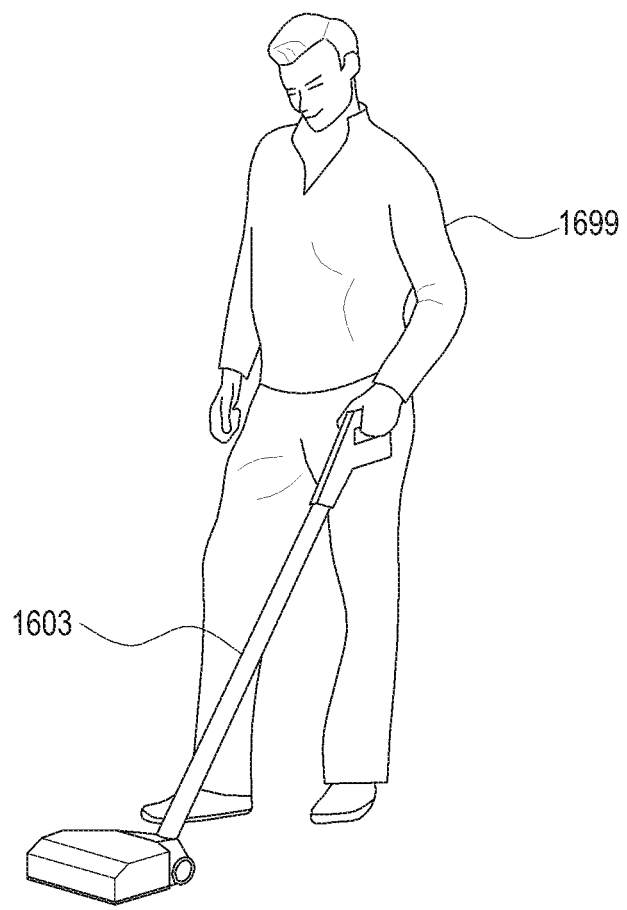
FIG. 16 illustrates a method of acquiring first activity information through a smart device according to an embodiment of the present disclosure.

FIG. 16 illustrates a method of acquiring first activity information through a smart device according to an embodiment of the present disclosure.

As illustrated in FIG. 16, according to various embodiments, a smart device 1603 may include a cleaner 1603.

According to various embodiments, the smart device 1603 may receive a power on command from a user 1699.

According to various embodiments, after receiving the power on command from the user 1699, the smart device 1603 may receive an operation control command from the user 1699.

According to various embodiments, the smart device 1603 may detect that the user activity corresponds to "cleaning" based on the power on command and/or the operation control command and transmit first activity information of the user activity corresponding to the "cleaning" to the server (for example, the server 701).

Figure 17:
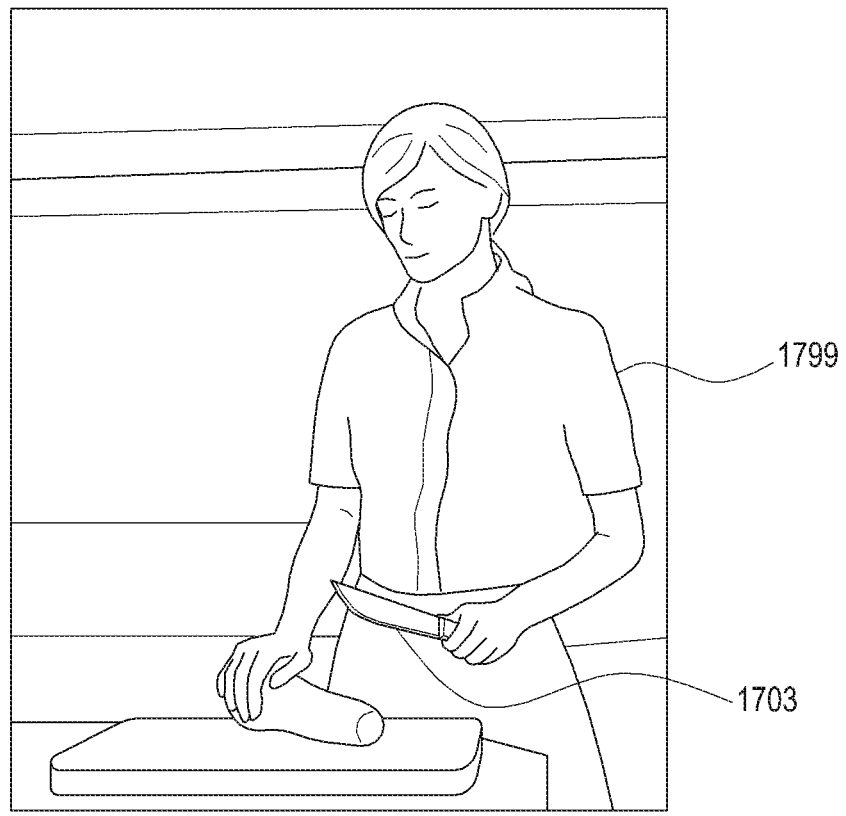
FIG. 17 illustrates a method of acquiring first activity information through a smart device according to an embodiment of the present disclosure.

FIG. 17 illustrates a method of acquiring first activity information through a smart device according to an embodiment of the present disclosure.

As illustrated in FIG. 17, according to various embodiments, a smart device 1703 may include a smart knife 1703.

According to various embodiments, the smart device 1703 may receive a power on command from a user 1799.

According to various embodiments, after receiving the power on command from the user 1799, the smart device 1703 may receive an operation control command from the user 1799.

According to various embodiments, the smart device 1703 may detect that the user activity corresponds to "cooking" based on the power on command and/or the operation control command and transmit first activity information of the user activity corresponding to "cooking" to the server (for example, the server 701).

Hereinafter, although not illustrated in FIG. 16 or 17, a method of acquiring first activity information through a smart device according to various embodiments will be described.

According to various embodiments, the smart device may include a running machine, X-bike, and other smart exercise equipment.

According to various embodiments, the running machine, the X-bike, and/or the other smart exercise equipment may receive the power on command from the user.

According to various embodiments, after receiving the power on command from the user, the running machine, the X-bike, and/or the other smart exercise equipment may receive the operation control command from the user.

According to various embodiments, the running machine, the X-bike, and/or the other smart exercise equipment may detect that the user activity corresponds to the "exercise" based on the power on command and/or the operation control command and transmit first activity information of the user activity corresponding to "exercise" to the server (for example, the server 701).

According to various embodiments, the smart device may include a bulb, a speaker, and/or a music player.

According to various embodiments, the smart device may include a bulb, a speaker, and/or a music player may receive the power on command from the user.

According to various embodiments, after receiving the power on command from the user, the bulb, the speaker, and/or the music player may receive the operation control command from the user.

According to various embodiments, the bulb, the speaker, and/or the music player may detect that the user activity corresponds to "rest" based on the power on command and/or the operation control command and transmit first activity information of the user activity corresponding to the "rest" to the server (for example, the server 701).

According to various embodiments, the smart device may include a bulb and/or an early sense.

According to various embodiments, the bulb and/or the early sense may receive the power on command from the user.

According to various embodiments, after receiving the power on command from the user, the bulb and/or the early sense may receive the operation control command from the user.

According to various embodiments, the bulb and/or the early sense may detect that the user activity corresponds to "sleep" and/or "sleeplessness" based on the power on command and/or the operation control command and transmit first activity information of the user activity corresponding to "sleep" and/or "sleeplessness" to the server (for example, the server 701).

According to various embodiments, the smart device may include a desk, a chair, and/or a desk lamp equipped with a motion sensor.

According to various embodiments, the desk, the chair, and/or the desk lamp equipped with the motion sensor may receive the power on command from the user.

According to various embodiments, after receiving the power on command from the user, the desk, the chair, and/or the desk lamp equipped with the motion sensor may receive the operation control command from the user.

According to various embodiments, after receiving the power on command from the user, the desk, the chair, and/or the desk lamp equipped with the motion sensor may detect that the user activity corresponds to "study" based on the power on command and/or the operation control command and transmit first activity information of the user activity corresponding to "study" to the server (for example, the server 701).

According to various embodiments, the smart device may include a speaker and/or a music player.

According to various embodiments, the speaker and/or the music player may receive the power on command from the user.

According to various embodiments, after receiving the power on command from the user, the speaker and/or the music player may receive the operation control command from the user.

According to various embodiments, the speaker and/or the music player may detect that the user activity corresponds to a "party" based on the power on command and/or the operation control command and transmit first activity information of the user activity corresponding to "party" to the server (for example, the server 701).

Figure 18:
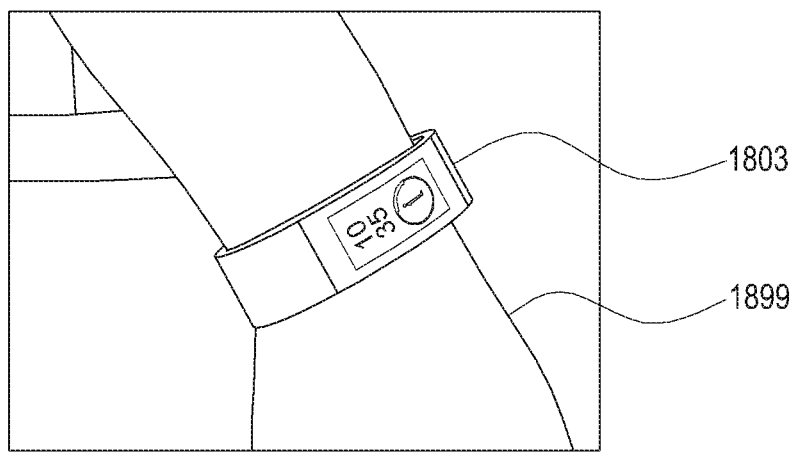
FIG. 18 illustrates a method of acquiring first activity information through a wearable device according to an embodiment of the present disclosure.

FIG. 18 illustrates a method of acquiring first activity information through a wearable device according to an embodiment of the present disclosure.

As illustrated in FIG. 18, according to various embodiments, a wearable device 1803 may detect biometric information of a user 1899.

According to various embodiments, the wearable device 1803 may detect that the user activity corresponds to "exercise" based on the biometric information of the user 1899.

According to various embodiments, after detecting that the user activity corresponds to "exercise", the wearable device 1803 may transmit first activity information of "exercise" to the server (for example, the server 701).

Figure 19:
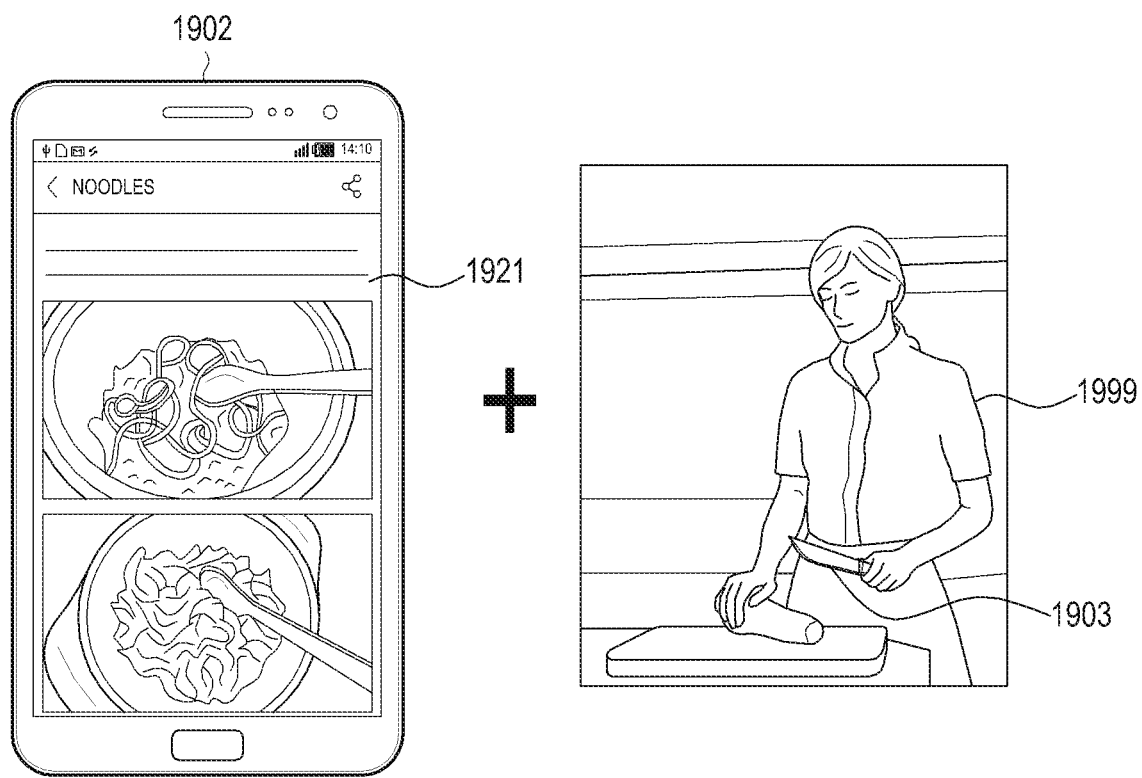
FIG. 19 illustrates a method of acquiring first activity information through an electronic device and a smart device according to an embodiment of the present disclosure.

FIG. 19 illustrates a method of acquiring first activity information through an electronic device and a smart device according to an embodiment of the present disclosure.

As illustrated in FIG. 19, according to various embodiments, an electronic device 1902 may receive a particular application execution command from the user, execute a particular application according to the particular application execution command, and display an execution screen of the particular application on the display. For example, the electronic device 1902 may receive a "cooking" application execution command from the user, execute a "cooking" application according to the "cooking" application execution command, and display an execution screen 1921 of the "cooking" application on the display.

According to various embodiments, the electronic device 1902 may generate first activity information of the user activity based on the execution of the particular application and/or the execution screen 1921 of the particular application and transmit the generated first activity information to the server (for example, the server 701). For example, the electronic device 1902 may generate first activity information on "cooking" based on the execution of the "cooking" application and/or the execution screen 1921 of the "cooking" application and transmit the generated first activity information to the server (for example, the server 701).

According to various embodiments, a smart device 1903 may receive a power on command for the smart device 1903 of a user 1999 and/or an operation control command for the smart device 1903. For example, a smart knife 1903 may receive the power on command for the smart knife 1903 of the user 1999 and/or the operation control command for the smart device 1903.

According to various embodiments, the smart device 1903 may generate first activity information of the user activity based on the power on command for the smart knife 1903 of the user 1999 and/or the operation control command for the smart device 1903 and transmit the generated first activity information to the server (for example, the server 701). For example, the smart knife 1903 may generate first activity information on "cooking" based on the power on command for the smart knife 1903 of the user 1999 and/or the operation control command for the smart device 1903 and transmit the generated first activity information to the server (for example, the server 701).

Figure 20:
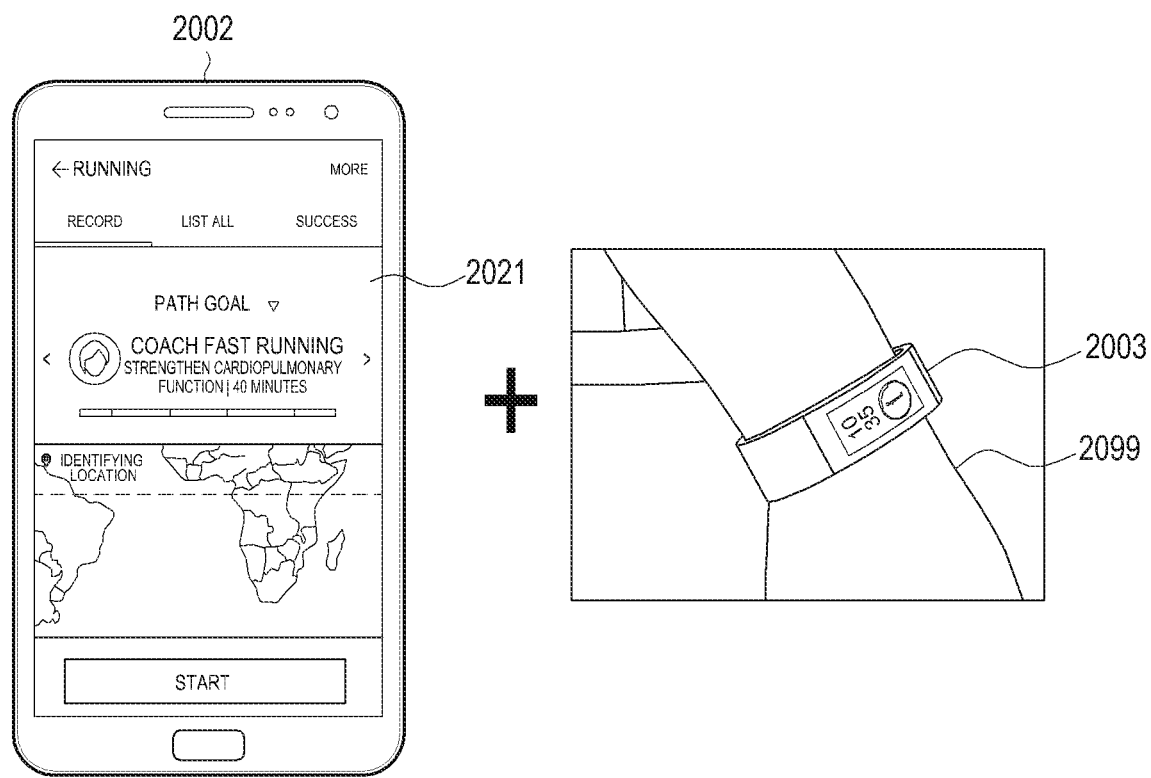
FIG. 20 illustrates a method of acquiring first activity information through an electronic device and a wearable device according to an embodiment of the present disclosure.

FIG. 20 illustrates a method of acquiring first activity information through an electronic device and a wearable device according to an embodiment of the present disclosure.

As illustrated in FIG. 20, according to various embodiments, an electronic device 2002 may receive a user's particular application execution command, execute a particular application according to the particular application execution command, and display an execution screen of the particular application on the display. For example, the electronic device 2002 may receive an "exercise" application execution command from the user, execute an "exercise" application according to the "exercise" application execution command, and display an execution screen 2021 of the "exercise" application on the display.

According to various embodiments, the electronic device 2002 may generate first activity information of the user activity based on the execution of the particular application and/or the execution screen 2021 of the particular application and transmit the generated first activity information to the server (for example, the server 701). For example, the electronic device 2002 may generate first activity information on the "exercise" based on the execution of the "exercise" application and/or the execution screen 2021 of the "exercise" application and transmit the generated first activity information to the server (for example, the server 701).

According to various embodiments, a wearable device 2003 may receive a power on command for the wearable device 2003 of a user 2099 and/or an operation control command for the wearable device 2003. For example, the wearable device 2003 may receive the power on command for the wearable device 2003 of the user 2099 and/or a biometric signal of the user 2099.

According to various embodiments, the wearable devices 2003 may generate first activity information of the user activity based on the power on command for the wearable device 2003 of the user 2099 and/or the biometric signal of the user 2099 and transmit the generated first activity information to the server (for example, the server 701). For example, a wearable watch 2003 may generate first activity information of user's biometric information when "exercise" is conducted based on the power on command for the wearable device 2003 of the user 2099 and/or the biometric signal of the user 2099 and transmit the generated first activity information to the server (for example, the server 701).

Figure 21:
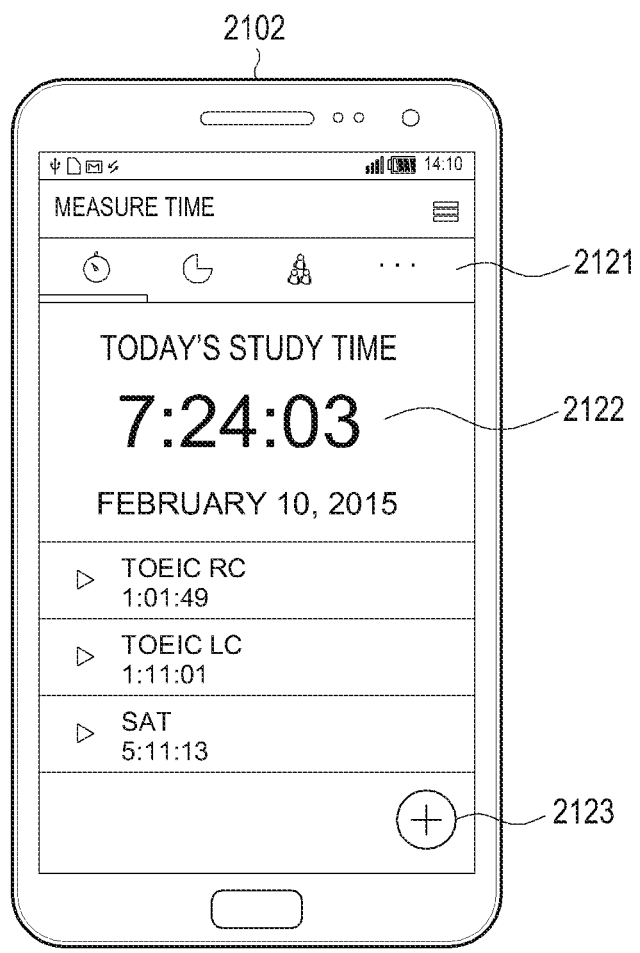
FIG. 21 illustrates a method of acquiring first activity information through an electronic device according to an embodiment of the present disclosure.

FIG. 21 illustrates a method of acquiring first activity information through an electronic device according to an embodiment of the present disclosure.

As illustrated in FIG. 21, according to various embodiments, an electronic device 2102 may execute a "study" related application and display an execution screen of the "study" related application on the display.

According to various embodiments, the electronic device 2102 may display a first menu 2121 for performing a "study" activity, a second menu 2122 indicating time information at the moment when "study" is conducted ("today's study time", "7:24:03", and Feb. 10, 2015), and a third menu 2123 for adding a new "study" schedule within the execution screen of the "study" related application.

According to various embodiments, the electronic device 2102 may generate first activity information of the user activity based on the first menu 2121 for conducting the "study" activity, the second menu 2122 indicating the time information at the moment when the "study" is conducted ("today's study time", "7:24:03", and Feb. 10, 2015), and the third menu 2123 for adding the new "study" schedule, which are displayed within the execution screen of the "study" related application. For example, the electronic device 2102 may generate first activity information including a type ("study") of the user activity and information on a time ("7:24:03", and Feb. 10, 2015) when the user activity is conducted.

FIGS. 22A to 22F illustrate smart devices according to various embodiments of the present disclosure.

Figure 22A:
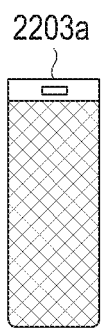
FIGS. 22A to 22F illustrate smart devices according to various embodiments of the present disclosure.

As illustrated in FIG. 22A, according to various embodiments, at least one smart device (for example, the smart device 703) may include a speaker 2203a.

According to various embodiments, the speaker 2203a may generate first activity information including "listening to music", "rest", and "party" based on a power on command and/or a music play command after the power on command from the user.

According to various embodiments, the speaker 2203a may output a particular sound source to a particular device based on a control command received from the server (for example, the server 701).

Figure 22B:
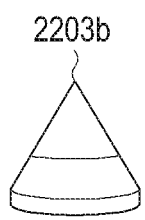

As illustrated in FIG. 22B, various embodiments, at least one smart device (for example, the smart device 703) may include an air freshener 2203b.

According to various embodiments, the air freshener 2203b may generate first activity information including "rest" and "sleep" based on a power on command and/or a scent dispersion command after the power on command.

According to various embodiments, the air freshener 2203b may disperse a particular scent based on the control command received from the server (for example, the server 701).

Figure 22C:
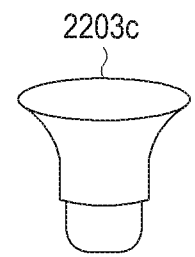

As illustrated in FIG. 22C, according to various embodiments, at least one smart device (for example, the smart device 703) may include a bulb 2203c.

According to various embodiments, the bulb 2203c may generate first activity information including "rest", "sleeplessness", and "party" based on the power on command and/or a lighting brightness control command received after the power control command from the user.

According to various embodiments, the bulb 2203c may output dimming with particular brightness based on the control command received from the server (for example, the server 701).

Figure 22D:
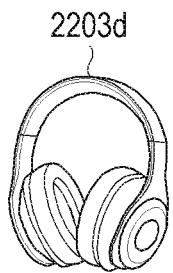

As illustrated in FIG. 22D, according to various embodiments, at least one smart device (for example, the smart device 703) may include headphones 2203d.

According to various embodiments, the headphones 2203d may generate first activity information including "listening to music", "rest", and "party" based on a power on command and/or a music play command after the power on command from the user.

According to various embodiments, the headphones 2203d may output a particular sound source to a particular device based on the control command received from the server (for example, the server 701).

Figure 22E:
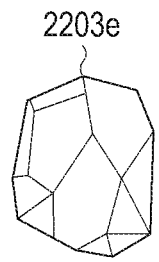

As illustrated in FIG. 22E, according to various embodiments, at least one smart device (for example, the smart device 703) may include a beacon 2203e.

Figure 22F:
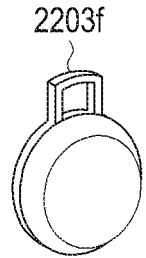

As illustrated in FIG. 22F, according to various embodiments, at least one smart device (for example, the smart device 703) may include a sensor 2203f.

FIGS. 23A to 23H illustrate smart devices according to various embodiments of the present disclosure.

Figure 23A:
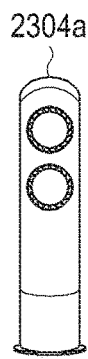
FIGS. 23A to 23H illustrate smart devices according to various embodiments.

As illustrated in FIG. 23A, according to various embodiments, at least one smart device may include an air-conditioner 2304a.

According to various embodiments, the air-conditioner 2304a may transmit air-conditioner device information to the server (for example, the server 701). For example, the air-conditioner 2304a may transmit operation state information of the air-conditioner 2304a to the server 701. For example, the operation state information of the air-conditioner 2304a may include temperature information, humidity information, wind information, and air quality information of the air-conditioner 2304a.

Figure 23B:
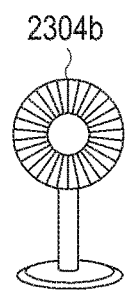

As illustrated in FIG. 23B, according to various embodiments, at least one smart device may include a fan 2304b.

According to various embodiments, the fan 2304b may transmit air-conditioner device information to the server (for example, the server 701). For example, the fan 2304b may transmit operation state information of the fan 2304b to the server 701. For example, the operation state information of the fan 2304b may include temperature information, humidity information, wind information, and air quality information of the fan 2304b.

Figure 23C:
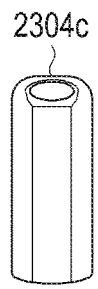

As illustrated in FIG. 23C, according to various embodiments, at least one smart device may include a cool presso 2304c.

According to various embodiments, the cool presso 2304c may transmit air-conditioner device information to the server (for example, the server 701). For example, the cool presso 2304c may transmit operation state information of the cool presso 2304c to the server 701. For example, the operation state information of the cool presso 2304c may include temperature information, humidity information, wind information, air quality information of the cool presso 2304c.

Figure 23D:
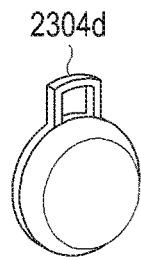

As illustrated in FIG. 23D, according to various embodiments, at least one smart device may include an air sensor 2304d.

According to various embodiments, the air sensor 2304d may transmit air-conditioner device information to the server (for example, the server 701). For example, the air sensor 2304d may transmit operation state information of the air sensor 2304d to the server 701. For example, the operation state information of the air sensor 2304d may include temperature information, humidity information, wind information, air quality information of the air sensor 2304d.

Figure 23E:
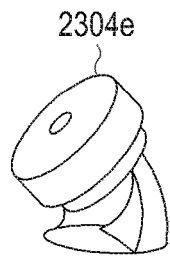

As illustrated in FIG. 23E, according to various embodiments, at least one smart device may include a heating fan 2304e.

According to various embodiments, the heating fan 2304e may transmit air-conditioner device information to the server (for example, the server 701). For example, the heating fan 2304e may transmit operation state information of the heating fan 2304e to the server 701. For example, the operation state information of the heating fan 2304e may include temperature information, humidity information, wind information, air quality information of the heating fan 2304e.

Figure 23F:
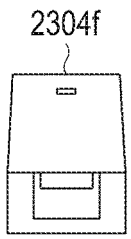
Figure 23G:
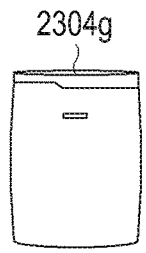

As illustrated in FIG. 23F, according to various embodiments, at least one smart device may include a dehumidifier 2304f.

According to various embodiments, the dehumidifier 2304f may transmit air-conditioner device information to the server (for example, the server 701). For example, the dehumidifier 2304f may transmit operation state information of the dehumidifier 2304f to the server 701. For example, the operation state information of the dehumidifier 2304f may include temperature information, humidity information, wind information, air quality information of the dehumidifier 2304f.

Figure 23H:
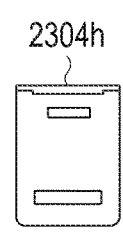

As illustrated in FIG. 23H, according to various embodiments, at least one smart device may include an air cleaner 2304h.

According to various embodiments, the air cleaner 2304h may transmit air-conditioner device information to the server (for example, the server 701). For example, the air cleaner 2304h may transmit operation state information of the air cleaner 2304h. For example, the operation state information of the air cleaner 82304h may include temperature information, humidity information, wind information, air quality information of the air cleaner 2304h.

Figure 24A:
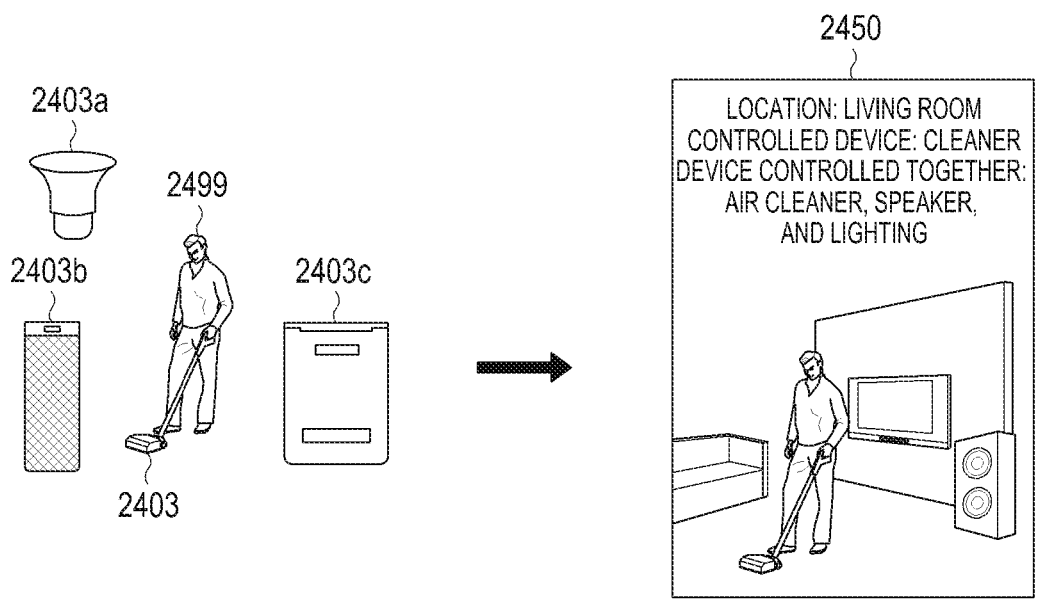
FIGS. 24A and 24B illustrate examples of a method of controlling a user environment according to various embodiments of the present disclosure.
Figure 24B:
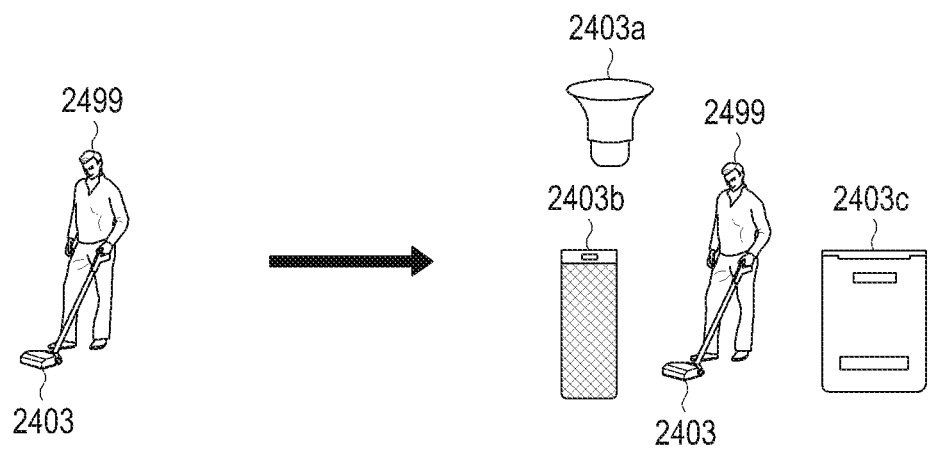

FIGS. 24A and 24B illustrate examples of a method of controlling a user environment according to various embodiments of the present disclosure.

As illustrated in FIG. 24A, according to various embodiments, a cleaner 2403 may receive a power on command and/or an operation control command for the cleaner 2403 from a user 2499. According to various embodiments, the cleaner 2403 may detect that a user activity corresponds to "cleaning" based on the power on command and/or the operation control command and generate first activity information on the "cleaning". According to various embodiments, the cleaner 2403 may transmit the generated first activity information to the server (for example, the server 701).

According to various embodiments, the server 701 may acquire device information corresponding to the "cleaning" activity for the first activity information based on the first activity information. For example, the server 701 may make a request for device information to a bulb 2403a, a speaker 2403b, and an air cleaner 2403c, which are driven when the "cleaning" activity is conducted, and/or may receive the device information after the request or receive the device information on every preset period without the request. According to various embodiments, the server 701 may acquire device information including a power on command for the bulb 2403a, the speaker 2403b, and the air cleaner 2403c driven when the "cleaning" activity is conducted and/or an operation control command for the bulb 2403a, the speaker 2403b, and the air cleaner 2403c after the power on command.

According to various embodiments, the server 701 may acquire location information ("living room") corresponding to the "cleaning" activity for the first activity information based on the first activity information. For example, the server 701 may acquire information on the location ("living room") where the "cleaning" activity for the first activity information is conducted from the cleaner 2403 based on the first activity information and/or acquire the information through a location information module (for example, the GPS) within the server 701.

According to various embodiments, the server 701 may generate environment control information corresponding to the "cleaning" activity for the first activity information based on the first activity information and/or the device information. For example, the server 701 may generate environment control information including information on location information ("living room") corresponding to the "cleaning" activity for the first activity information, a controlled smart device ("cleaner"), and a smart device controlled together (air cleaner, speaker, and lighting).

According to various embodiments, the server 701 may generate environment control information based on activity information corresponding to at least one detected user activity as well as the "cleaning" activity, device information corresponding to the activity information, or the device information and/or the activity information.

As illustrated in FIG. 24B, according to various embodiments, after the environment control information is generated, the cleaner 2403 may receive a power on command and/or an operation control command after the power on command from the user 2499. According to various embodiments, the cleaner 2403 may detect that the user activity corresponds to "cleaning" based on the power on command and/or the operation control command after the power on command. According to various embodiments, the cleaner 2403 may generate second activity information of the detected "cleaning" activity. According to various embodiments, the cleaner 2403 may transmit the generated second activity information to the server (for example, the server 701).

According to various embodiments, the server 701 may detect environment control information corresponding to the transmitted second activity information among the generated environment control information. For example, the server 701 may detect environment control information corresponding to the "cleaning" activity for the transmitted second activity information among the generated environment information.

According to various embodiments, the server 701 may acquire device information corresponding to the "cleaning" activity based on the detected environment control information corresponding to the "cleaning" activity. For example, the server 701 may acquire information on "smart devices controlled together with the cleaner" corresponding to the environment control information corresponding to the "cleaning" activity based on the detected environment control information corresponding to the "cleaning" activity. For example, the server 701 may acquire information indicating that "the smart devices controlled together with the cleaner are the air cleaner, the speaker, and the lighting" corresponding to the environment control information corresponding to the "cleaning" activity based on the detected environment control information corresponding to the "cleaning" activity.

According to various embodiments, the server 701 may control an air cleaner 2403c, a speaker 2403b, and a bulb 2403a that are smart devices used together with the cleaner 2403 when the "cleaning" activity is detected based on the acquired device information indicating that "the smart devices controlled together with the cleaner are the air cleaner, the speaker, and the lighting". According to various embodiments, the server 701 may transmit the power on command and/or the operation control command to the air cleaner 2403c, the speaker 2403b, and the bulb 2403a that are the smart devices used together with the cleaner 2403 when the "cleaning" activity is detected based on the acquired device information indicating that "the smart devices controlled together with the cleaner are the air cleaner, the speaker, and the lighting".

Figure 25A:
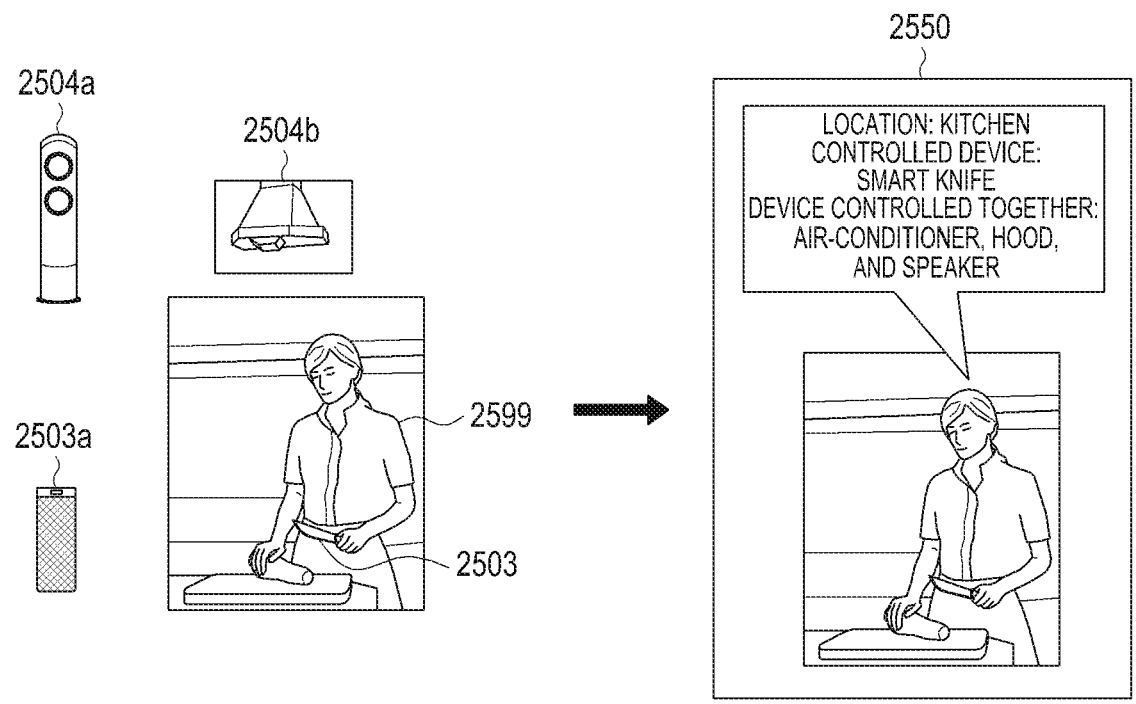
FIGS. 25A and 25B illustrate examples of a method of controlling a user environment according to various embodiments of the present disclosure.
Figure 25B:
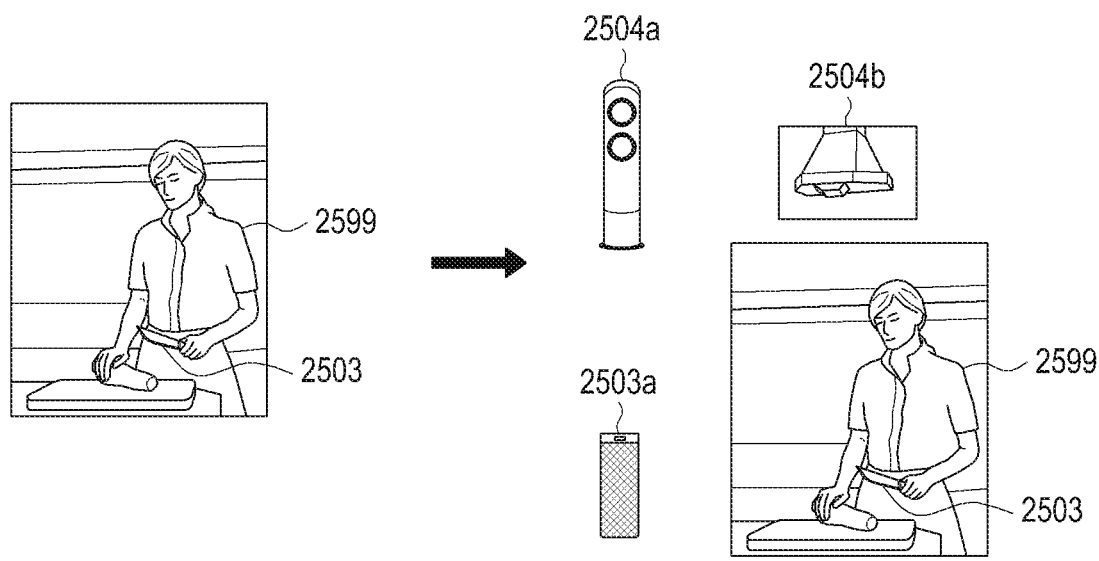

FIGS. 25A and 25B illustrate examples of a method of controlling a user environment according to various embodiments of the present disclosure.

As illustrated in FIG. 25A, according to various embodiments, a smart knife 2503 may receive a power on command and/or an operation control command for the smart knife 2503 from a user 2599. According to various embodiments, the smart knife 2503 may detect that a user activity corresponds to "cooking" based on the power on command and/or the operation control command and generate first activity information on "cooking". According to various embodiments, the smart knife 2503 may transmit the generated first activity information to the server (for example, the server 701).

According to various embodiments, the server 701 may acquire device information corresponding to the "cooking" activity for the first activity information based on the first activity information. For example, the server 701 may make a request for the device information to a speaker 2503a, an air-conditioner 2504a, and a hood 2504d, which are driven when the "cooking" activity is conducted, and/or may receive the device information after the request or receive the device information on every preset period without the request. According to various embodiments, the server 701 may acquire device information including a power on command for the speaker 2503a, the speaker 2503b, and the hood 2504b driven when the "cooking" activity is conducted and/or an operation control command for the speaker 2503a, the speaker 2503b, and the hood 2504b after the power on command.

According to various embodiments, the server 701 may acquire location information ("kitchen") corresponding to the "cooking" activity for first activity information based on the first activity information. For example, the server 701 may acquire information on the location ("kitchen") where the "cooking" activity for the first activity information is conducted from the smart knife 2503 based on the first activity information and/or acquire the information from a location information module (for example, GPS) within the server 701.

According to various embodiments, the server 701 may generate environment control information corresponding to the "cooking" activity for the first activity information based on the first activity information and/or the device information. For example, the server 701 may generate environment control information including location information ("kitchen") corresponding to the "cooking" activity for the first activity information, information on a controlled smart device ("smart knife"), and information on smart devices controlled together (air cleaner, speaker, and hood).

According to various embodiments, the server 701 may generate environment control information based on activity information corresponding to at least one user activity as well as the "cooking" activity, device information corresponding to the activity information, or the device information and/or the activity information.

As illustrated in FIG. 25B, according to various embodiments, after the environment control information is generated, the smart knife 2503 may receive a power on command and/or an operation control command after the power on command from the user 2599. According to various embodiments, the smart knife 2503 may detect that the user activity corresponds to "cooking" based on the power on command and/or the operation control command after the power on command. According to various embodiments, the smart knife 2503 may generate second activity information of the detected "cooking" activity. According to various embodiments, the smart knife 2503 may transmit the generated second activity information to the server (for example, the server 701).

According to various embodiments, the server 701 may detect environment control information corresponding to the transmitted second activity information among the generated environment control information. For example, the server 701 may detect environment control information corresponding to the "cooking" activity for the transmitted second activity information among the generated environment information.

According to various embodiments, the server 701 may acquire device information corresponding to the environment control information corresponding to the "cooking" activity based on the detected environment control information corresponding to the "cooking" activity. For example, the server 701 may acquire information on "smart devices controlled together with the smart knife" corresponding to the environment control information corresponding to the "cooking" activity based on the detected environment control information corresponding to the "cooking" activity. For example, the server 701 may acquire information indicating that "the smart devices controlled together with the smart knife are the speaker, the air-conditioner, and the hood" corresponding to the environment control information corresponding to the "cooking" activity based on the detected environment control information corresponding to the "cooking" activity.

According to various embodiments, the server 701 may control a speaker 2503a, an air-conditioner 2504a, and a hood 2504b that are smart devices used together with the smart knife 2503 when the "cooking" activity is detected based on the acquired device information indicating that "the smart devices controlled together with the smart knife are the speaker, the air-conditioner, and the hood". According to various embodiments, the server 701 may transmit the power on command and/or the operation control command after the power on command to the speaker 2503a, the air-conditioner 2504a, and the hood 2504b that are the smart devices used together with the smart knife 2503 when the "cooking" activity is detected based on the acquired device information indicating that "the smart devices controlled together with the smart knife are the air-conditioner, the speaker, and the hood".

Figure 26:
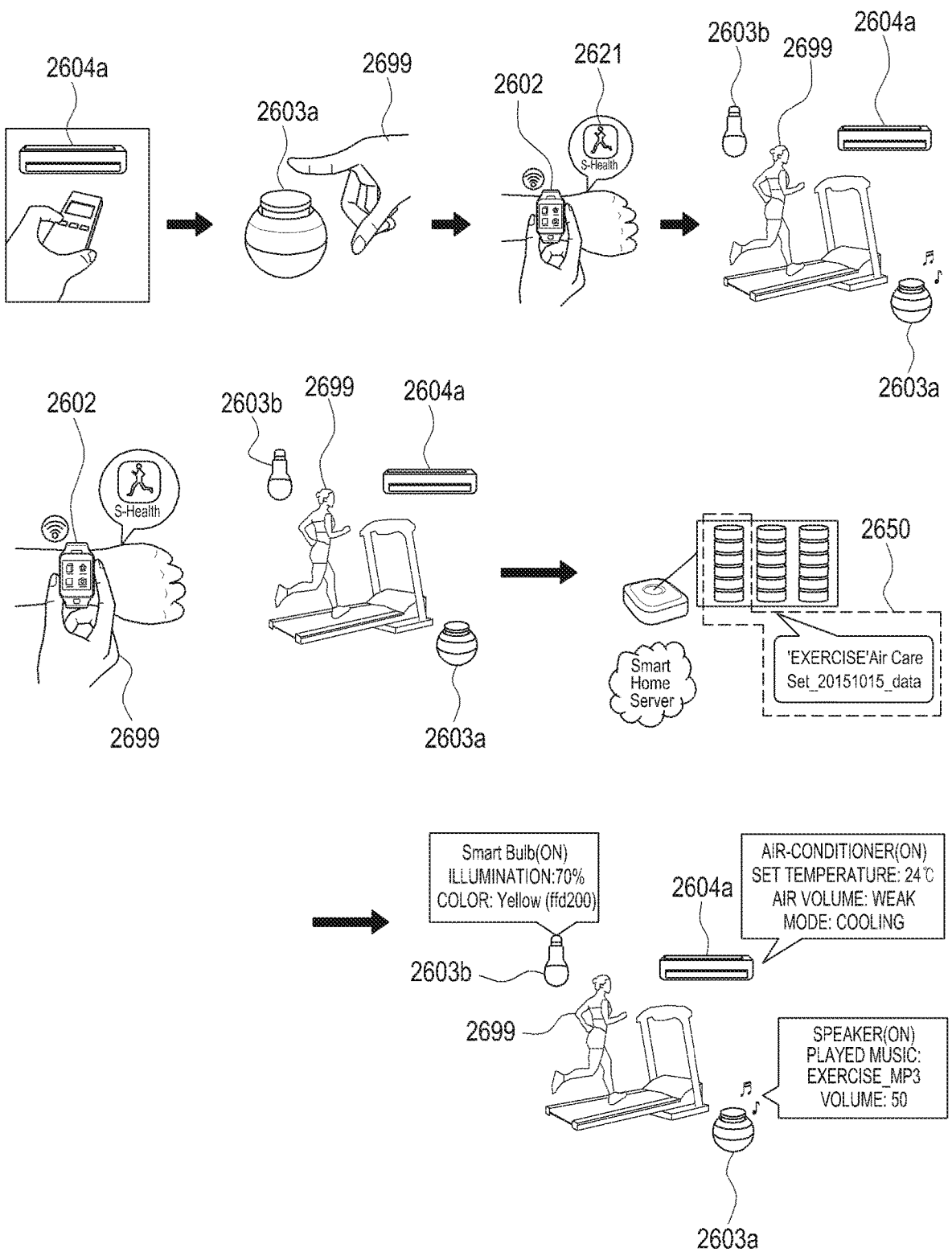
FIG. 26 illustrates an example of a method of controlling a user environment according to various embodiments of the present disclosure.

FIG. 26 illustrates an example of a method of controlling a user environment according to various embodiments of the present disclosure.

As illustrated in FIG. 26, a user 2699 may input a "24 degree cooling" setting command into an air-conditioner 2604a, input a command for playing an "exercise 01_exciting_mp3" sound source into a speaker 2603a, and then input a command for executing an "exercise" application 2621 into a wearable watch 2602.

According to various embodiments, the wearable watch 2602 may transmit first activity information of the "exercise" activity to the server (for example, the server 701) based on an execution command of the "exercise" application 2621.

According to various embodiments, when the first activity information is transmitted, the server 701 may acquire device information indicating that "the set temperature of the air-conditioner is 24 degrees" and "the played sound source is exercise 01_exciting_mp3" corresponding to the "exercise" activity to the air-conditioner 2604a and the speaker 2603a.

According to various embodiments, when the first activity information is transmitted, the server 701 may acquire device information indicating that "illumination of a bulb is 70% and a color is yellow (ffd200)", which is another piece of device information corresponding to the "exercise" activity, from the bulb 2603b.

According to various embodiments, the server 701 may generate environment control information 2650 such as "exercise Air care set_20151015_data" including the first activity information on "exercise" and/or the device information indicating that "the set temperature of the air-conditioner is 24 degrees", "the played sound source is exercise 01_exciting_mp3", and "illumination of the bulb is 70% and the color is yellow (ffd200)" based on the first activity information on the "exercise" and/or the device information indicating that "the set temperature of the air-conditioner is 24 degrees", "the played sound source is exercise 01_exciting_mp3", and "illumination of the bulb is 70% and the color is yellow (ffd200)".

As illustrated in FIG. 26, the user 2699 may input a command for executing the "exercise" application 2621 into the wearable watch 2602.

According to various embodiments, the wearable watch 2602 may detect that the user activity corresponds to "exercise" based on the execution command for the "exercise" application 2621, generate second activity information of the detected "exercise" activity, and transmit the generated second activity information to the server 701.

According to various embodiments, the server 701 may detect environment control information 2650 such as "exercise Air care set_20151015_data" including the first activity information on "exercise" corresponding to the "exercise" activity for the transmitted second activity information and/or the device information indicating that "the set temperature of the air-conditioner is 24 degrees", "the played sound source is exercise 01_exciting_mp3", and "illumination of the bulb is 70% and the color is yellow (ffd200)".

According to various embodiments, the server 701 may acquire device information corresponding to the "exercise" activity for the second activity information based on the environment control information 2650 such as "exercise Air care set_20151015_data" including the first activity information on the "exercise" corresponding to the "exercise" activity for the transmitted second activity information and/or the device information indicating that "the set temperature of the air-conditioner is 24 degrees", "the played sound source is exercise 01_exciting_mp3", and "illumination of the bulb is 70% and the color is yellow (ffd200)". For example, the server 701 may acquire the device information indicating that "the set temperature of the air-conditioner is 24 degrees", "the played sound source is exercise 01_exciting_mp3", and "illumination of the bulb is 70% and the color is yellow (ffd200)" based on the environment control information 2650 such as "exercise Air care set_20151015_data" including the first activity information on the "exercise" corresponding to the "exercise" activity for the transmitted second activity information and/or the device information indicating that "the set temperature of the air-conditioner is 24 degrees", "the played sound source is exercise 01_exciting_mp3", and "illumination of the bulb is 70% and the color is yellow (ffd200)".

According to various embodiments, the server 701 may generate an air-conditioner control command indicating that "the set temperature of the air-conditioner is 24 degrees", a speaker control command indicating that "the played sound source is exercise 01_exciting_mp3", and a bulb control command indicating that "the illumination of the bulb is 70% and the color is yellow (ffd200)" by using the device information indicating that "the set temperature of the air-conditioner is 24 degrees", "the played sound source is exercise 01_exciting_mp3", and "illumination of the bulb is 70% and the color is yellow (ffd200)".

According to various embodiments, the server 701 may transmit the air-conditioner control command indicating that "the set temperature of the air-conditioner is 24 degrees" to the air-conditioner 2604*a*, transmit the speaker control command indicating that "the played sound source is exercise 01_exciting_mp3" to the speaker 2603*a*, and transmit the bulb control command indicating that "the illumination of the bulb is 70% and the color is yellow (ffd200)" to the bulb 2604*b*.

Figure 27:
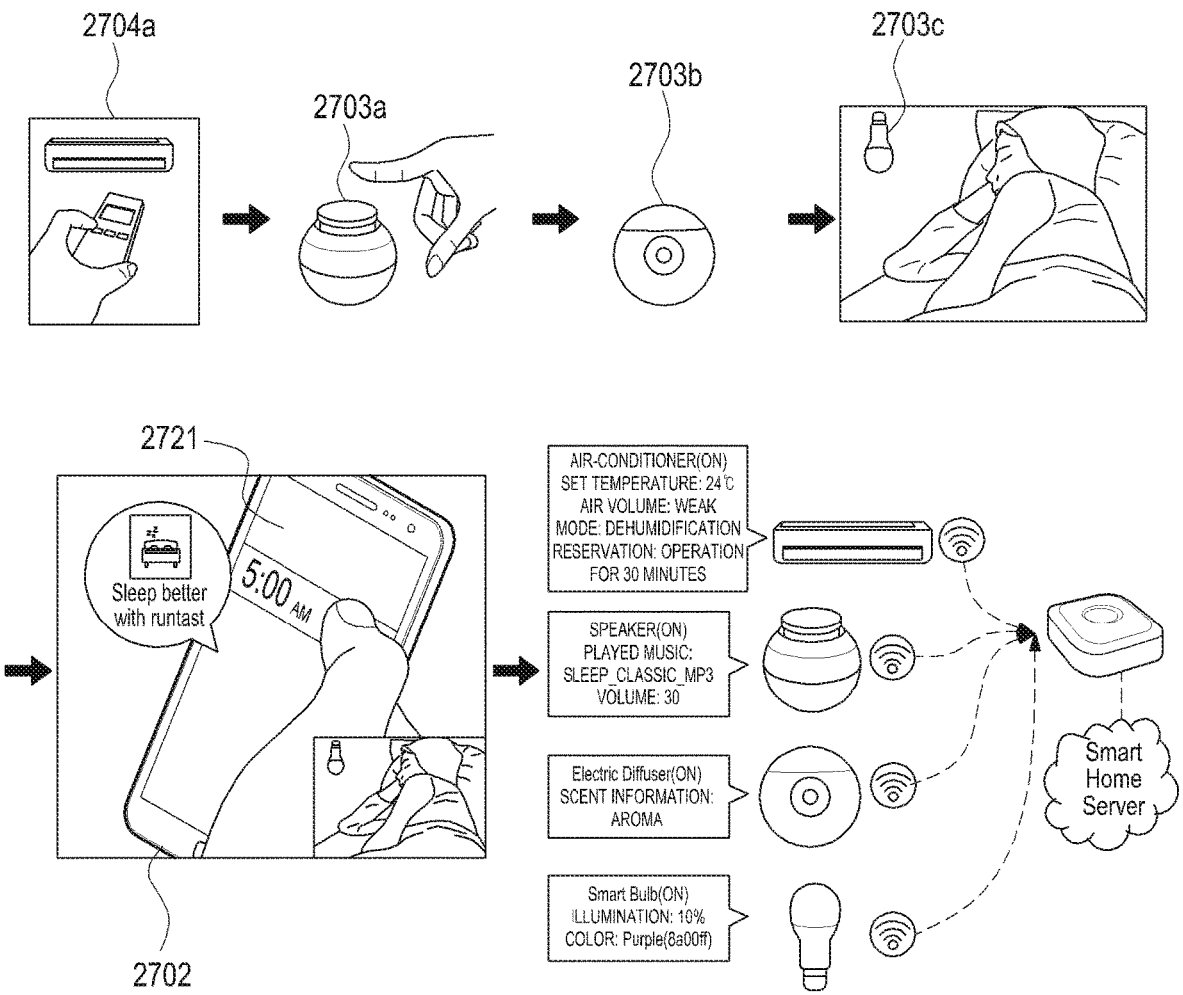
FIG. 27 illustrates an example of a method of generating environment control information according to various embodiments of the present disclosure.

FIG. 27 illustrates an example of a method of generating environment control information according to various embodiments of the present disclosure.

As illustrated in FIG. 27, a user 2799 may input a setting command indicating that "a set temperature of an air-conditioner is 27 degrees, a mode is dehumidification, an air volume is weak, and a reservation time is 30 minutes" into an air-conditioner 2704*a*, input a command for playing a "sleep 02_classic_mp3" sound source into a speaker 2703*a*, and then input a command for executing a "sleep" application 2721 into an electronic device 2702. According to various embodiments, the user 2799 may input a command indicating that "scent is aroma" to an air freshener 2703*b*. According to various embodiments, the user 2799 may input a command indicating that "illumination of a bulb is 10% and a color is purple (8a00ff)" to a bulb 2703*c*.

According to various embodiments, the electronic device 2702 may transmit first activity information of the "sleep" activity to the server (for example, server 701) based on the execution command of the "sleep" application 2721.

According to various embodiments, when the first activity information is transmitted, the server 701 may acquire device information indicating that "the set temperature of the air-conditioner is 27 degrees, the mode is dehumidification, the air volume is weak, and the reservation time is 30 minutes", "the played sound source is sleep 02_classic_mp3", "scent is aroma", and "the illumination of the bulb is 10% and the color is purple (8a00f)" from the air-conditioner 2704*a* and the speaker 2703*a*.

According to various embodiments, the server 701 may generate environment control information 2750 such as "sleep Air care set_20151016_data" including the first activity information on the "sleep" and/or the device information indicating that "the set temperature of the air-conditioner is 27 degrees, the mode is dehumidification, the air volume is weak, and the reservation time is 30 minutes", "the played sound source is sleep 02_classic_mp3", "scent is aroma", and "the illumination of the bulb is 10% and the color is purple (8a00f)" based on the first activity information on the "sleep" and/or the device information indicating that "the set temperature of the air-conditioner is 27 degrees, the mode is dehumidification, the air volume is weak, and the reservation time is 30 minutes", "the played sound source is sleep 02_classic_mp3", "scent is aroma", and "the illumination of the bulb is 10% and the color is purple (8a00f)".

Figure 28:
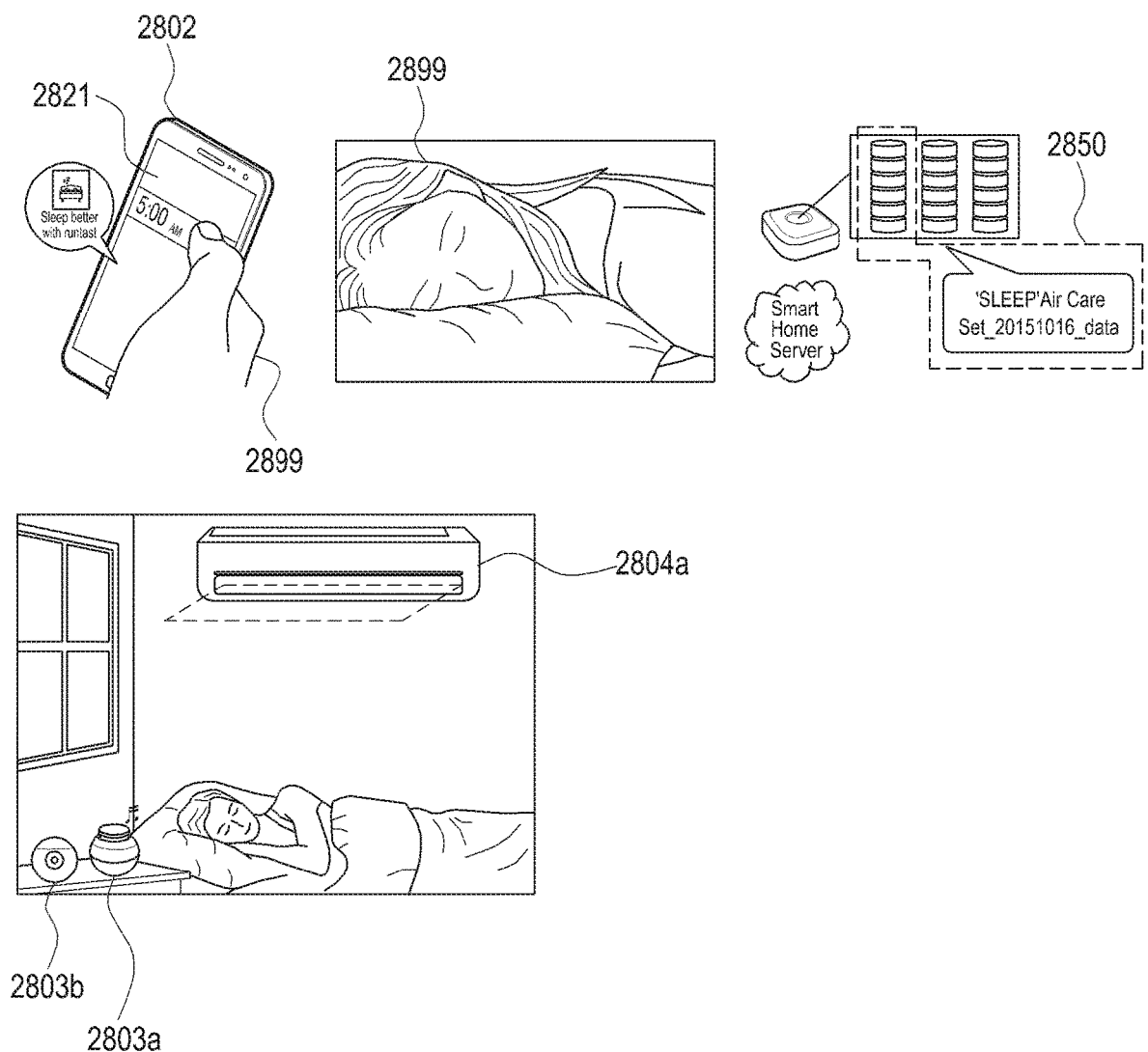
FIG. 28 illustrates an example of a method of detecting environment control information and controlling a user environment according to various embodiments of the present disclosure.

FIG. 28 illustrates an example of a method of detecting environment control information and controlling a user environment according to various embodiments of the present disclosure.

As illustrated in FIG. 28, a user 2899 may input a command for executing a "sleep" application 2821 in an electronic device 2802.

According to various embodiments, the electronic device 2802 may detect that a user activity corresponds to "sleep" based on the execution command for the "sleep" application 2821, generate second activity information of the detected "sleep" activity, and transmit the generated second activity information to the server 701.

According to various embodiments, the server 701 may detect environment control information 2850 such as "sleep Air care set_20151016_data" including the first activity information on "sleep" corresponding to the "sleep" activity for the transmitted second activity information and/or the device information indicating that "the set temperature of the air-conditioner is 27 degrees, the mode is dehumidification, the air volume is weak, and the reservation time is 30 minutes", "the played sound source is sleep 02_classic_mp3", "scent is aroma", and "the illumination of the bulb is 10% and the color is purple (8a00f)".

According to various embodiments, the server 701 may acquire device information corresponding to the "sleep" activity for the second activity information based on the environment control information 2850 such as "sleep Air care set_20151016_data" including the first activity information on "sleep" corresponding to the "sleep" activity for the acquired second activity information and/or the device information indicating that "the set temperature of the air-conditioner is 27 degrees, the mode is dehumidification, the air volume is weak, and the reservation time is 30 minutes", "the played sound source is sleep 02_classic_mp3", "scent is aroma", and "the illumination of the bulb is 10% and the color is purple (8a00f)". For example, the server 701 may acquire the device information indicating that "the set temperature of the air-conditioner is 27 degrees, the mode is dehumidification, the air volume is weak, and the reservation time is 30 minutes", "the played sound source is sleep 02_classic_mp3", "scent is aroma", and "the illumination of the bulb is 10% and the color is purple (8a00f)" from the environment control information 2850 based on the environment control information 2850 such as "sleep Air care set_20151016_data" including the first activity information on "sleep" corresponding to the "sleep" activity for the acquired second activity information and/or the device information indicating that "the set temperature of the air-conditioner is 27 degrees, the mode is dehumidification, the air volume is weak, and the reservation time is 30 minutes", "the played sound source is sleep 02_classic_mp3", "scent is aroma", and "the illumination of the bulb is 10% and the color is purple (8a00f)".

According to various embodiments, the server 701 may generate an air-condition control command indicating that "the set temperature of the air-conditioner is 27 degrees, the mode is dehumidification, the air volume is weak, and the reservation time is 30 minutes", a speaker control command indicating that "the played sound source is sleep 02_classic_mp3", and an air freshener control command indicating that "the scent is aroma" by using the device information indicating that "the set temperature of the air-conditioner is 27 degrees, the mode is dehumidification, the air volume is weak, and the reservation time is 30 minutes", "the played sound source is sleep 02_classic_mp3", "scent is aroma", and "the illumination of the bulb is 10% and the color is purple (8a00f)".

According to various embodiments, the server 701 may transmit the air-conditioner control command indicating that "the set temperature of the air-conditioner is 27 degrees, the mode is dehumidification, the air volume is weak, and the reservation time is 30 minutes" to an air-conditioner 2804*a*, transmit the speaker control command indicating that ""the played sound source is sleep 02_classic_mp3" to a speaker 2803*a*, and the air freshener control command indicating that "the scent is aroma" to an air freshener 2803*b*.

Figure 29:
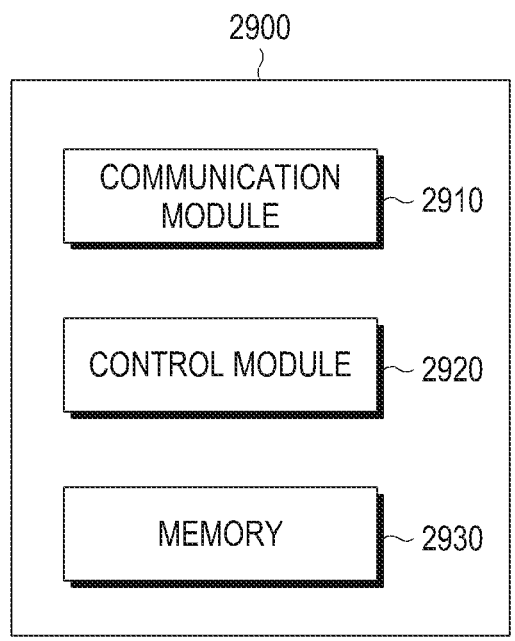
FIG. 29 illustrates a server according to various embodiments of the present disclosure.

FIG. 29 illustrates a server according to various embodiments.

As illustrated in FIG. 29, according to various embodiments, a server 2900 may include a communication module 2910, a control module 2920, and/or a memory 2930.

According to various embodiments, the communication module 2910 may acquire first activity information corresponding to at least one user activity and second activity information corresponding to a new user activity from at least one smart device (for example, the smart device 703 and/or the electronic device (for example, the electronic device 702)), and/or device information from at least one smart device 703.

According to various embodiments, the control module 2920 may generate environment control information corresponding to at least one user activity based on the first activity information and the device information acquired using the communication module 2910.

According to various embodiments, the control module 2920 may generate environment control information corresponding to at least one user activity based on the first activity information and the device information acquired using the communication module 2910 and store the generated environment control information in the memory 2930.

According to various embodiments, after generating the environment control information corresponding to at least one user activity based on the first activity information and the device information acquired using the communication module 2910 and storing the generated environment control information in the memory 2930, the control module 2920 may acquire environment control information corresponding to a new user activity detected by the smart device 703 and/or the electronic device 702 from the environment control information stored in the memory 2930.

According to various embodiments, after generating the environment control information corresponding to at least one user activity based on the first activity information and the device information acquired using the communication module 2910 and storing the generated environment control information in the memory 2930, and then acquiring environment control information corresponding to a new user activity detected by the smart device 703 and/or the electronic device 702 from the environment control information stored in the memory 2930, the control module 2920 may control at least one smart device 703 by using device information corresponding to the acquired environment control information.

Figure 30:
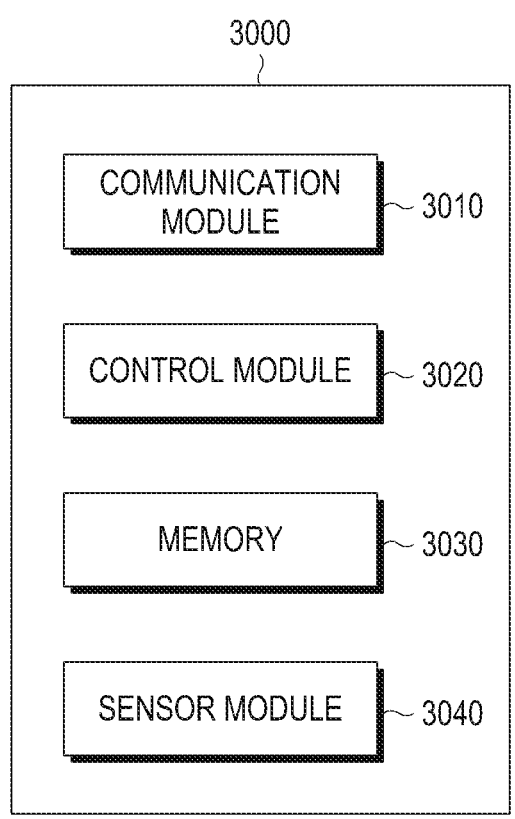
FIG. 30 illustrates a smart device according to various embodiments of the present disclosure.

FIG. 30 illustrates a smart device according to various embodiments.

As illustrated in FIG. 30, according to various embodiments, a smart device 3000 may include a communication module 3000, a control module 3020, a memory 3030, and/or a sensor module 3040.

According to various embodiments, the sensor module 3040 may detect at least one user activity and detect a new user activity after the detection of at least one user activity.

According to various embodiments, the control module 3020 may generate first activity information based on at least one detected user activity, generate second activity information based on the new user activity detected after the detection of at least one user activity, and generate device information corresponding to at least one user activity.

According to various embodiments, the control module 3020 may generate first activity information based on at least one detected user activity, generate second activity information based on a new user activity detected after the detection of at least one user activity, generate device information corresponding to at least user activity, and store the generated device information, first activity information, and/or second activity information in the memory 3030.

According to various embodiments, the control module 3020 may transmit the generated device information, first activity information, and/or second activity information to the server (for example, the server 2900) by using the communication module 3010.

According to various embodiments, the server 2900 may generate environment control information corresponding to at least one user activity based on the transmitted first activity information and device information, detect environment control information corresponding to the transmitted second activity information among the generated environment control information, and generate a control signal by using device information corresponding to the detected environment control information among the acquired device information, and the communication module 3010 may receive the control signal from the server 2900 according to a control of the control module 3020.

A method of controlling a user environment by a server according to various embodiments of the present disclosure may include: an operation of acquiring first activity information of at least one user activity; an operation of acquiring device information corresponding to the at least one user activity based on the acquired first activity information; an operation of generating environment control information corresponding to the at least one user activity based on the acquired first activity information and device information; an operation of acquiring second activity information of a user activity; detecting environment control information corresponding to the user activity among the generated environment control information based on the acquired second activity information; and an operation of controlling at least one smart device in the acquired device information based on device information corresponding to the detected environment control information.

According to various embodiments, the operation of acquiring the first activity information may include an operation of acquiring the first activity information of at least one user activity detected through at least one device among at least one electronic device and the at least one smart device.

According to various embodiments, at least one electronic device may include at least one of a smart phone and a wearable device.

According to various embodiments, the operation of acquiring the first activity information may include an operation of detecting a category of an application executed through the at least one electronic device and an operation of detecting the at least one user activity based on the detected category of the application.

According to various embodiments, the first activity information may include time information of the executed application.

According to various embodiments, the operation of acquiring the device corresponding to the at least one user activity may include an operation of acquiring the device information corresponding to the at least one user activity from the at least one smart device based on the received first activity information.

According to various embodiments, the operation of acquiring the device corresponding to the at least one user activity may include an operation of acquiring the device corresponding to the at least one user activity when the at least one user activity is detected from the at least one smart device.

According to various embodiments, the operation of acquiring the device corresponding to the at least one user activity may include an operation of making a request for the device corresponding to the at least one user activity to the at least one smart device.

According to various embodiments, the environment control information may include at least one of at least one user activity for the acquired first activity information, the device information corresponding to the at least one user activity, weather information corresponding to the at least one user activity, time information corresponding to the at least one user activity, and place information corresponding to the at least one user activity.

According to various embodiments, the controlling of the at least one smart device may include an operation of generating a control command for controlling the at least one smart device by using the device information corresponding to the detected environment control information and an operation of transmitting the generated control command to the at least one smart device.

According to various embodiments, the first activity information may include first type information on a type of the at least one user activity and the second activity information includes second type information on a type of the user activity.

According to various embodiments, the device information may include the at least one user activity or information on at least one smart device driven together when the user activity is detected.

According to various embodiments, the device information may include the at least one user activity or indoor environment information detected by at least one smart device driven together when the user activity is detected.

According to various embodiments, the indoor environment information may include at least one piece of temperature information, humidity information, wind information, and air quality information detected by the at least one smart device.

According to various embodiments, the device information may include at least one piece of set temperature information, set humidity information, set window information, and set air quality information input into the at least one smart device.

According to various embodiments, the device information may include the at least one user activity or operation state information of at least one smart device driven together when the user activity is detected.

According to various embodiments, the server may include a home server connected to the at least one smart device and Internet through communication.

A method of controlling a user environment using an electronic device according to various embodiments of the present disclosure may include: an operation of detecting at least one user activity; an operation of transmitting first activity information of the at least one user activity to a server; an operation of detecting a user activity; an operation of transmitting second activity information of the user activity to the server; an operation of acquiring device information corresponding to the at least one user activity based on the transmitted first activity information, generating environment control information corresponding to the at least one user activity based on the transmitted first activity information and the device information, detecting environment control information corresponding to the transmitted second activity information among the generated environment control information, and receiving information on a result of controlling the at least one smart device based on device information corresponding to the detected environment control information by the server; and an operation of displaying the information on the result of controlling the at least one smart device.

A method controlling a user environment using at least one smart device according to various embodiments of the present disclosure may include: an operation of detecting at least one user activity; an operation of transmitting first activity information of the at least one user activity to a server; an operation of transmitting device information corresponding to the at least one user activity to the server; an operation of detecting a user activity; an operation of transmitting second activity information of the user activity to the server, the server acquiring device information corresponding to the at least one user activity based on the transmitted first activity information, generating environment control information corresponding to the at least one user activity based on the transmitted first activity information and the device information, and detecting environment control information corresponding to the transmitted second activity information among the generated environment control information; and an operation of receiving a control signal generated using device information corresponding to the detected environment control information among the acquired device information from the server.

A server according to various embodiments of the present disclosure may include: a communication module for acquiring first activity information of at least one user activity from an electronic device or at least one smart device outside the server, acquiring device information corresponding to the at least one user activity based on the received first activity information, and acquiring second activity information of a new user activity after the at least one user activity is acquired; and a control module for generating environment control information corresponding to the at least one user activity based on the acquired first activity information and the device information, detecting environment control information corresponding to the user activity based on the acquired second activity information among the generated environment control information, and for controlling the at least one smart device based on device information corresponding to the detected environment control information among the acquired device information through the control module.

An electronic device according to various embodiments of the present disclosure may include: a sensor module for detecting at least one user activity and detecting a new user activity after the at least one user activity is detected; a processor for generating first activity information based on the at least one user activity and generating second activity information based on the new user activity; a communication interface for transmitting the first activity information and the second activity information, wherein the server acquires device information corresponding to the at least one user activity based on the transmitted first activity information, generates environment control information corresponding to the at least one user activity based on the transmitted first activity information and the device information, and detects environment control information corresponding to the transmitted second activity information among the generated environment control information, and receiving information on a result of controlling at least one smart device using device information corresponding to the detected environment control information among the acquired device information; and a display for displaying the information on the result of controlling the at least one smart device.

At least one smart device according to various embodiments of the present disclosure may include a sensor module for detecting at least one user activity and detecting a new user activity after the at least one user activity is detected; a control module for generating first activity information based on the at least one user activity, generating second activity information based on the new user activity, and generating device information corresponding to the at least one user activity; and a communication module for transmitting the first activity information, the second activity information, and the device information to a server, wherein the server acquires device information corresponding to the at least one user activity based on the transmitted first activity information, generates environment control information corresponding to the at least one user activity based on the transmitted first activity information and the device information, and detects environment control information corresponding to the transmitted second activity information among the generated environment control information, and receiving a control signal generated using device information corresponding to the detected environment control information among the acquired device information from the server.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A server comprising:
   a communication module; and
   a control module configured to:
      receive, through the communication module, a plurality of activity information of a plurality of user activities performed by a plurality of external electronic devices and a plurality of device information of the plurality of external electronic devices corresponding to the plurality of activity information respectively, wherein the plurality of device information includes operation state information of the plurality of external electronic devices,
      identify a type of each of the plurality of user activities among a plurality of predetermined types based on the received plurality of activity information the plurality of predetermined types including: cooking, exercise, cleaning, entertaining, reading, and sleeping,
      generate a plurality of environment control information corresponding to the identified type of each of the plurality of user activities based on the received plurality of device information,
      receive, through the communication module, first activity information of a first user activity after the plurality of environment control information is generated,
      identify a first type of the first user activity among the plurality of predetermined types based on the received first activity information, and first environment control information corresponding to the first type of the first user activity among the generated plurality of environment control information, and
      control, by using the communication module, at least one external electronic device among the plurality of external electronic devices using first device information corresponding to the identified first environment control information among the plurality of device information.

2. The server of claim 1, wherein the plurality of external electronic devices include at least one of a smart phone or a wearable device.

3. The server of claim 1, wherein the control module is configured to:
   identify a category of an application executed through the plurality of external electronic devices based on the plurality of activity information, and identify the type of each of the plurality of user activities based on the identified category of the application.

4. The server of claim 3, wherein the received plurality of activity information includes time information of the executed application.

5. The server of claim 1, wherein, when the plurality of user activities is detected from the plurality of external electronic devices, the control module is configured to receive, through the communication module, the plurality of device information corresponding to the plurality of user activities.

6. The server of claim 1, wherein the control module is configured to transmit, through the communication module, a request for the plurality of device information corresponding to the plurality of user activities to the plurality of external electronic devices through the communication module.

7. The server of claim 1, wherein each of the generated plurality of environment control information include at least one of:
   a user activity for activity information,
   device information corresponding to a user activity,
   weather information corresponding to a user activity,
   time information corresponding to a user activity, or
   place information corresponding to a user activity.

8. The server of claim 1, wherein the control module is configured to:
   generate a control command for controlling the at least one external electronic device by using the first device information corresponding to the identified first environment control information, and
   transmit the generated control command to the at least one external electronic device through the communication module.

9. The server of claim 1, wherein the received plurality of device information include information on one or more external electronic devices driven together when at least one respective user activity is detected.

10. The server of claim 9, wherein the received plurality of device information include indoor environment information detected by the one or more external electronic devices driven together when the at least one respective user activity is detected.

11. The server of claim 10, wherein the indoor environment information includes at least one of temperature information, humidity information, wind information, or air quality information detected by the one or more external electronic devices.

12. The server of claim 10, wherein the plurality of device information is input into the one or more external electronic devices.

13. The server of claim 1, wherein each of the plurality of external electronic devices driven together when at least one respective user activity is detected.

14. The server of claim 1, wherein the server comprises a home server connected to the plurality of external electronic devices and Internet through the communication module.

15. The server of claim 1, wherein the plurality of external electronic devices include home appliances connected to the server through communication.

16. A method of controlling a user environment by a server, the method comprising:
   receiving a plurality of activity information of a plurality of user activities performed by a plurality of external electronic devices, and a plurality of device information of the plurality of external electronic devices corresponding to the plurality of activity information respectively, wherein the plurality of device information includes operation state information of the plurality of external electronic devices;
   identifying a type of each of the plurality of user activities among a plurality of predetermined types based on the received plurality of activity information, the plurality of predetermined types including: cooking, exercise, cleaning, entertaining, reading, and sleeping;
   generating a plurality of environment control information corresponding to the identified type of each of the plurality of user activities based on the received plurality of device information;
   receiving first activity information of a first user activity after the plurality of environment control information is generated;
   identifying a first type of the first user activity among the plurality of predetermined types based on the received first activity information, and identifying first environment control information corresponding to the first type of the first user activity among the generated plurality of environment control information; and
   controlling at least one external electronic device among the plurality of external electronic devices using first device information corresponding to the identified first environment control information among the plurality of device information.

\* \* \* \* \*